MAGNETIC CORE LOGICAL CIRCUITRY

Filed Oct. 11, 1956

INVENTORS
Ladimer J. Andrews
Walter G. Edwards
James F. Hudson

By Earl Beust
Louis A. Kline
John T. Matlago
Their Attorneys

INVENTORS
Ladimer J. Andrews
Walter G. Edwards
James F. Hudson

By Earl Bunst
Louis A. Kline
John J. Matlago
their Attorneys

INVENTORS
Ladimer J. Andrews
Walter G. Edwards
James F. Hudson

By Earl Beust
Louis A Kline
John J. Matlago
their Attorneys

INVENTORS
Ladimer J. Andrews
Walter G. Edwards
James F. Hudson

By Earl Beust
Louis A Kline
John J. Matlago
their Attorneys

By

INVENTORS
Ladimer J. Andrews
Walter G. Edwards
James F. Hudson

Earl Bernst
Louis A. Kline
John J. Matlago
Their Attorneys

INVENTORS
Ladimer J. Andrews
Walter G. Edwards
James F. Hudson

By Earl Beust
Louis A Kline
John J. Matlago
Their Attorneys

| | | Numerical orders | | | | |
|---|---|---|---|---|---|---|
| | | $2^3$ | $2^2$ | $2^1$ | $2^0$ | |
| Augend | | 0 | 1 | 1 | 0 | E register |
| Addend | | 1 | 0 | 1 | 1 | F register |
| Carry | 1 | 1 | 1 | 0 | 0 | K register |
| Sum | 1 | 0 | 0 | 0 | 1 | |
| | | E Register | | | | |

| Augend (Es) | Addend (Fs) | Carry-in (Ks) | Sum (Es) | Carry-out (Ks) |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

$$e_S = E_S F_S K_S + E_S F_S' K_S' + E_S' F_S K_S' + E_S' F_S' K_S$$
$$k_S = E_S F_S + E_S K_S + F_S K_S$$

INVENTORS
Ladimer J. Andrews
Walter G. Edwards
James F. Hudson

By Earl Benst
Louis A Kline
John J. Matlago
their Attorneys

INVENTORS
Ladimer J. Andrews
Walter G. Edwards
James F. Hudson

By Earl Benst
Louis A Kline
John J. Matlago
their Attorneys

INVENTORS
Ladimer J. Andrews
Walter G. Edwards
James F. Hudson
By Carl Beust
Louis A Kline
John T. Matlago
their Attorneys

| Program Count | Flip-Flops N1 N2 | Function | Control Cores |
|---|---|---|---|
| 0 | 0 0 | Recirculate | 1Ec |
| 1 | 1 0 | Transfer | 2Ec |
| 2 | 0 1 | Complementation | 3Ec |
| 3 | 1 1 | Recirculate sign<br>Count | 4Ec<br>5Ec, 6Ec |

INVENTORS
Ladimer J. Andrews
Walter G. Edwards
James F. Hudson

By Pearl Benit
Louis A Kline
John J. Matlago
their Attorneys

United States Patent Office 3,040,986

Patented June 26, 1962

3,040,986

MAGNETIC CORE LOGICAL CIRCUITRY

Ladimer J. Andrews, Gardena, Walter G. Edwards, Manhattan Beach, and James F. Hudson, Hermosa Beach, Calif., assignors to The National Cash Register Company, Dayton, Ohio, a corporation of Maryland Filed Oct. 11, 1956, Ser. No. 615,279
32 Claims. (Cl. 235—176)

This invention relates to electronic circuits for generating digital processes on stored data and more particularly to novel circuit arrangements employing magnetic cores capable of successively performing logical manipulation of the data as the digital process advances.

Logical functions, which can be defined by Boolean notation, for example, are mechanized in digital computers by basic circuitry and equipment utilizing, in some embodiments, vacuum tubes and diodes, either severally or in combination. Such facilities are characterized by various disadvantages. Thus, in the case of vacuum tubes, limited operating life, high power consumption, and circuit complexity are involved. In the case of diodes, the introduction of a term as an additional condition to a logical function already mechanized requires an additional diode; furthermore, as diode networks become complex, as in multilevel matrices, the design of sources which supply operating voltages for driving these networks also becomes more complex. Additionally, the electrical characteristics of diodes have been found to change as they are used for extended periods of time.

It is thus desirable to adopt other constructions, which are superior in at least these respects, to circuitry arranged to synthesize a logical function.

A basic component of continuously increasing utilization approaches the ideal for these purposes. This component is the magnetic core having a substantially rectangular hysteresis characteristic. The magnetic core, in addition to having many characteristics which overcome the above-stated deficiencies of vacuum tubes and diodes, is possessed of exceptionally long life and electrical properties consistent over extended periods of use.

The art is cognizant of the fact that magnetic cores so utilized must be driven, i.e., arranged to be switched, to one or the other state of remanent magnetization, by currents flowing in windings inductively coupled to the core structure. One known system supplies core drive from other cores and is thereby enabled to arrange cores to synthesize logical expressions. However, cores are not considered to make good drivers in this instance since they do not represent constant current or voltage sources, in that their output is a function of the number of other cores comprising their load. Further, for each logical term, as described by the Boolean equations, to be mechanized in a circuit, the core-driving-core technique necessitates the incorporation of one or more additional cores; and, if the cores are to be the same in size, the conductor must be coupled to the driving core by a multiple winding. Thus, when mechanizing complex functions, in accordance with the known technique, the number of cores required becomes large and the winding thereof becomes intricate, involving a considerable increase in the attendant difficulties of construction.

Accordingly, it is an object of this invention to provide a new and improved magnetic core switching arrangement for generating logical functions.

Another object of this invention is to provide magnetic core logical circuitry which, in combination with other storage cores and a transfer circuit, provides a highly versatile arithmetic register for use in a large-scale digital computer.

Another object of this invention is to provide a novel arrangement for interconnecting and driving a plurality of magnetic core registers to perform step-by-step digital processing on data stored therein.

It is a further object of this invention to provide means for performing logical operations, such as addition, utilizing a minimum number of magnetic cores as components for computation and control.

A broader object of this invention is to provide a magnetic core circuit mechanization of a Boolean expression characterized by the feature that no additional cores are required to include additional logical terms in an existing logical function once the terms have been generated. Logical functions can be derived in an existing mechanization by merely passing a conductor through the proper sequence of cores in magnetic coupling association with each. It should be obvious that a system of this nature is inherently economical and that the economy increases as more complex functions are to be derived. Specifically, this economy is a result of the feature of the invention which limits the number of propositions in a logical product to only the number of conductors that can be inductively coupled to the core structure.

A feature of the invention resides in the representation of a logical proposition as a signal which is coupled to the core structure so as to inhibit the switching of the core from the false to the true state by its driving currents and, by this means, introducing the logical value of the proposition into the core. An inhibiting signal is arranged to have the ability to cancel the switching effect of the driving current but does not itself ever drive the core. As a result, the source of the inhibiting signal is never required by the switching action to furnish power, regardless of the number of cores which comprise its load. A related feature is that the inhibiting signal is not required to supply power to compensate for power reduction of the driving signal. This is because the only time an inhibiting signal could be required to furnish such power is when a core changes state; and, since the function of the inhibiting signal is to prevent core switching, the driving current source cannot suffer loss of power.

Further objects and many of the attendant advantages of the invention will become apparent by referring to the following detailed description of the drawings, in which.

Figure 7:
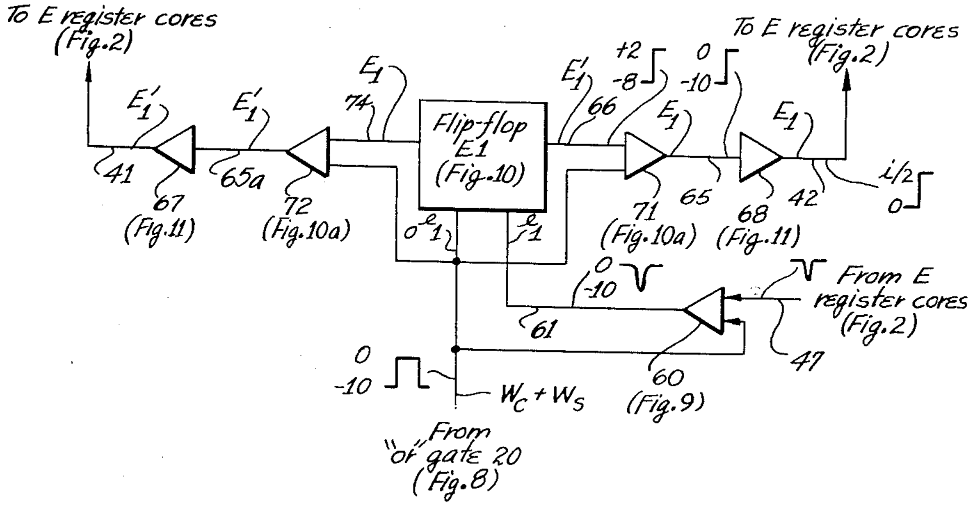
FIG. 7 is a block diagram of the register transfer circuit.
Figure 7A:
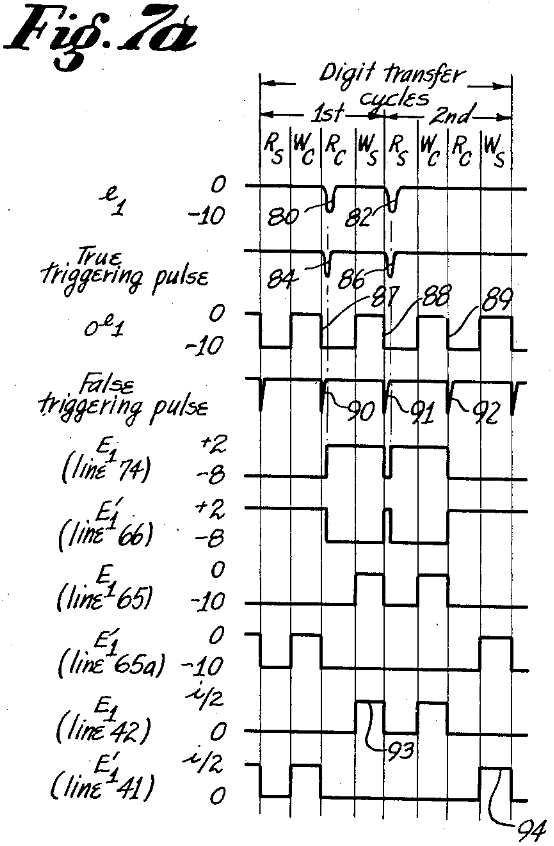

FIG. 7*a* is a set of curves illustrating the operation of the transfer circuit.

Figures 8, 9:
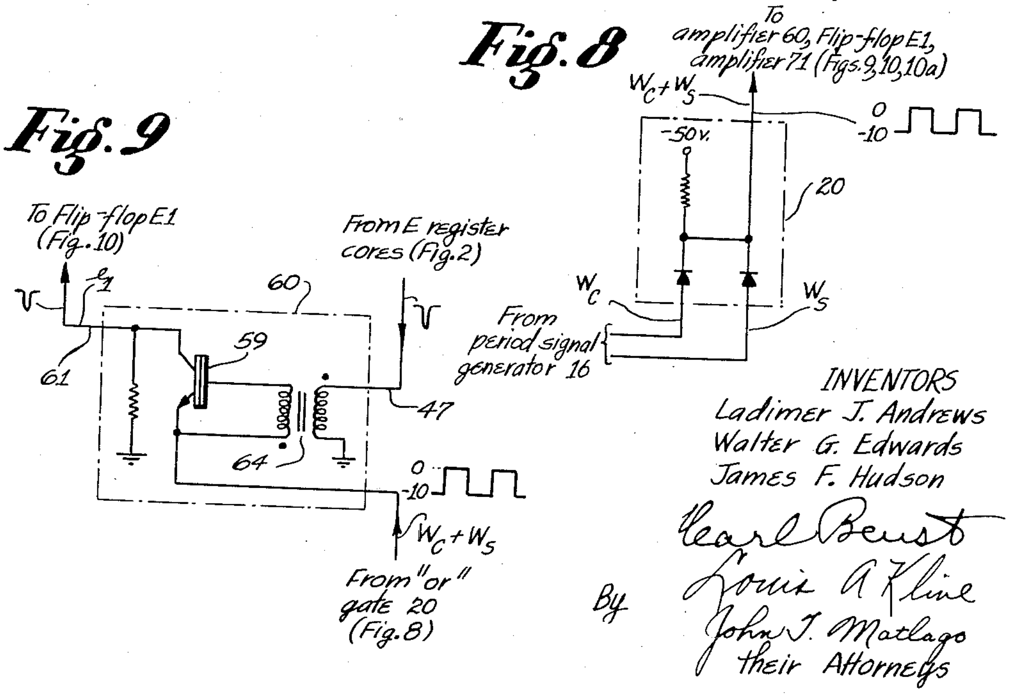

FIG. 8 shows the network provided for supplying the signal $w_c+w_s$ used for controlling the transfer circuit.

FIG. 9 is a schematic diagram of the transfer circuit input amplifier.

Figure 10:
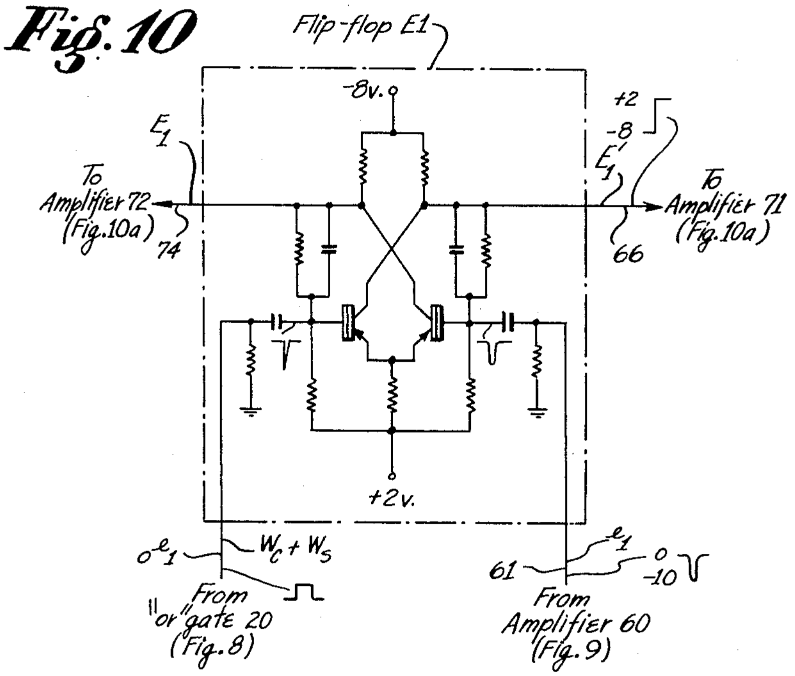

FIG. 10 is a schematic diagram of the transfer circuit flip-flop.

Figure 10A:
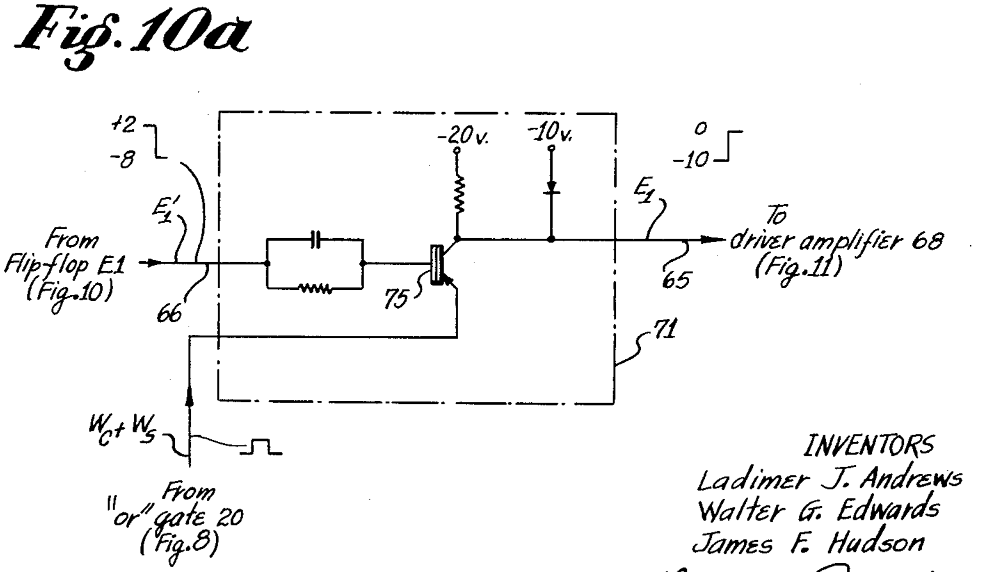

FIG. 10*a* is a schematic diagram of the transfer circuit flip-flop output amplifier.

Figures 11, 12, 14:
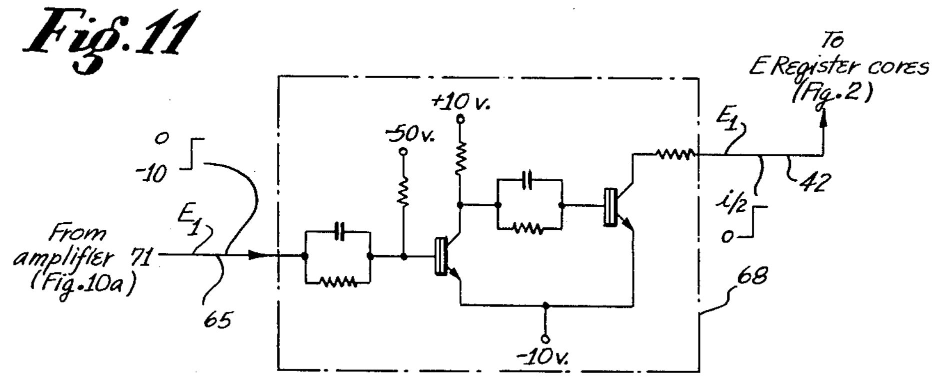

FIG. 11 is a schematic diagram of the transfer circuit driver-amplifier.

FIG. 12 is an example of the addition of the two binary numbers referred to in describing how adder circuits according to the present invention operate.

Figure 2:
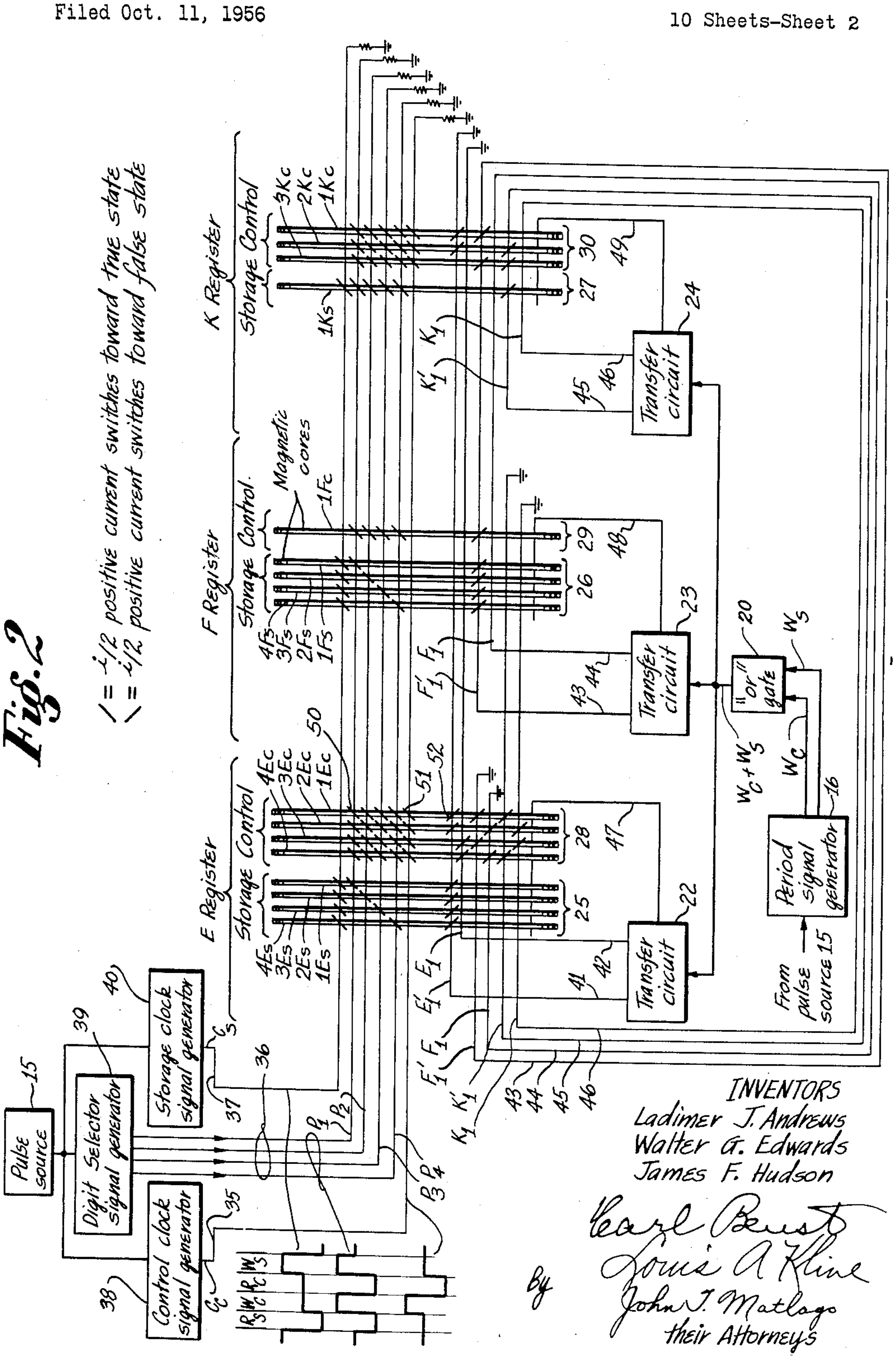
FIG. 2 is a schematic diagram of the serial adder shown in FIG. 1.
Figure 13:
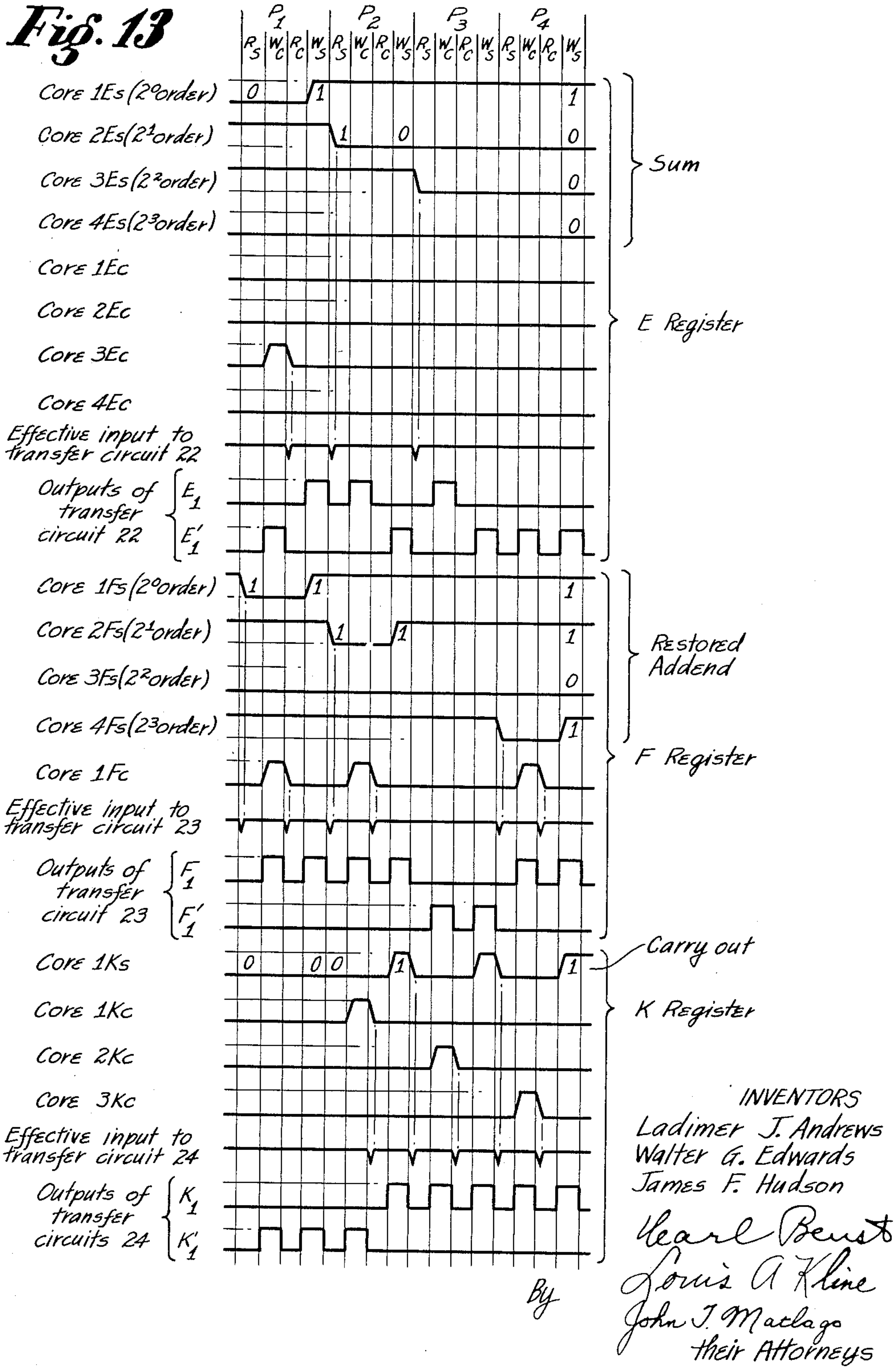

FIG. 13 is a graph of waveforms showing the voltage at various points of the adder of FIG. 2, while performing addition.

FIG. 14 is an adder truth table showing the derivation of the logical equations mechanized by the circuits of the present invention.

Figures 14A, 16:
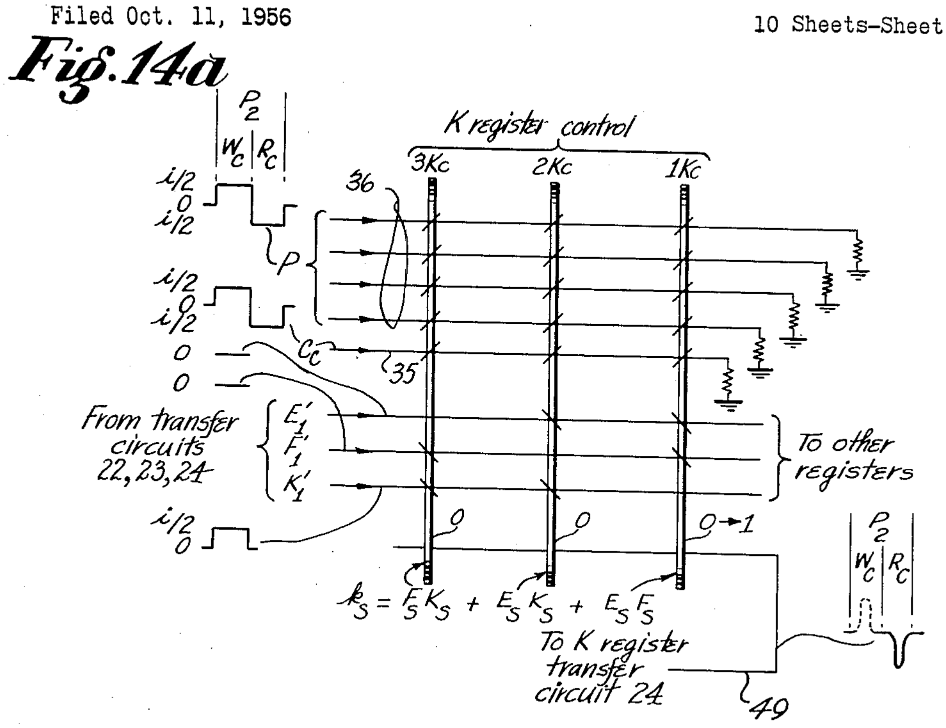

FIG. 14*a* shows how the K register control cores generate the terms of the carry digit Boolean equation.

Figure 15:
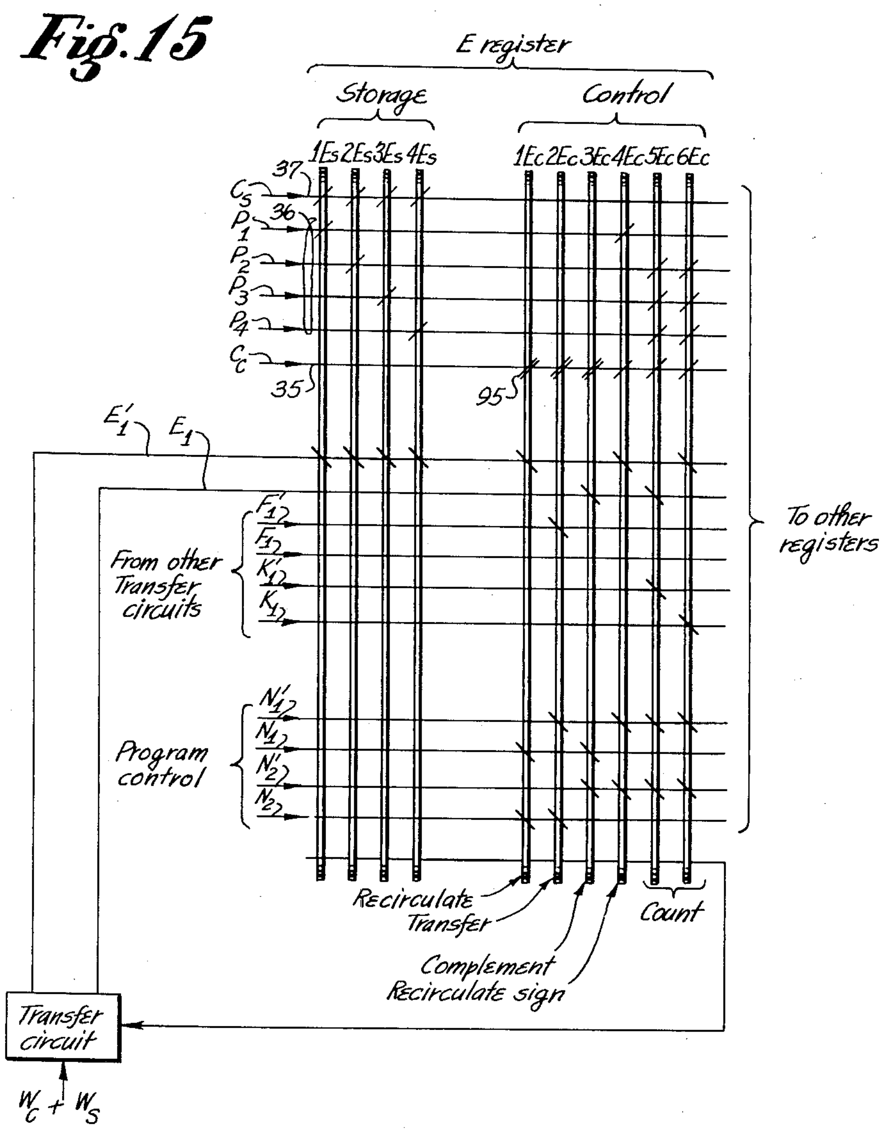

FIG. 15 is a schematic diagram of a computer register used for illustrating the mechanization of various basic logical operations in accordance with the circuit arrangements of the present invention.

FIG. 16 tabulates the operations accomplished by the circuit of FIG. 15, showing how the E register control cores for performing these operations are selected by the program control.

The present invention refers to the utilization of magnetic cores in the logical circuitry comprised in the central processor of a digital computer. Thus the invention is embodied in, for example, a computing device comprised in the main of three registers. Each register contains two arrays of magnetic cores, one array being employed for the storage of the binarily coded digits to be manipulated, and the other array being employed for purposes of performing the manipulation of these digits. Each register also includes a transfer circuit, hereinafter described, which functions to sequentially read out information from the arrays, delay this information and set it up as inhibiting signals capable of affecting the switching of the cores in the arrays. In the preferred embodiment, which exemplifies the invention by a circuitry arrangement for adding four-order binary numbers, the three registers are designated the E register, the F register, and the K register. By the use of these registers, as controlled by externally supplied timing signals and the aforementioned internally generated inhibiting signals, the particular circuitry arrangement shows how a serial addition of the four binary digits of the addend, as set up in the four storage cores of the F register, can be made to the four binary digits of the augend, as set up in the four storage cores of the E register, utilizing the single storage core of the K register in which to set up the single binary digit of any carry generated by a partial addition. The timing signals of the preferred embodiment include a pair of clock signals and storage core selecting signals. The latter define digit transfer cycles of equal duration, and essentially serve to sequentially select the binary digits to be added, commencing with the least significant. The combination of the clock signals with the storage core selecting signals establishes, for the digit transfer cycle of each step of a data process, such as partial addition, a sequence of four equal time periods within each digit transfer cycle. These four periods are designated symbolically as period $R_s$, period $W_c$, period $R_c$, and period $W_s$. During periods $R_s$ and $R_c$, interrogation, i.e., read out, of the storage and control cores, respectively, is done; and during periods $W_c$ and $W_s$, setting, i.e., writing into, the control and storage cores, respectively, is done. More particularly, during the four periods of a digit transfer cycle, operations are ordered as follows. During period $R_s$, the selected storage cores of the E and F registers and the K register are interrogated and the transfer circuits are set in accordance with the digits read out; during period $W_c$, the transfer circuits generate inhibiting signals corresponding to their states and the control cores of all registers not wound to be inhibited by these signals are set; during period $R_c$, the control cores of all registers are interrogated and all transfer circuits are set in accordance with the information read out; and during period $W_s$, the transfer circuits generate inhibiting signals corresponding to their states and the selected storage cores of the E and F registers and the K register not wound to be inhibited by these respective signals are set.

The above operation prevails for the general mechanization of arithmetic processes capable of Boolean expression. Specific mechanization for the process of serial addition involves only the proper winding of the storage cores to effect inhibition of setting with signals represented by the corresponding logical propositions in the adder equations derived, as well understood, from a simple truth table. The logic which controls the generation of these signals is contained in the winding arrangement of the control cores and it is significant to note that the transfer circuit for each register is utilized by its respective storage and control cores in common.

Thus, once the cores and their assignments in the registers have been established for an arithmetic process, such as addition, other arithmetic processes, such as subtraction, multiplication, etc., may also be mechanized, utilizing these same cores by merely providing inhibiting signal windings appropriate to the Boolean equations representing these other processes. It is this characteristic of the invention which contributes a versatility in the art not previously contemplated.

Figure 1:
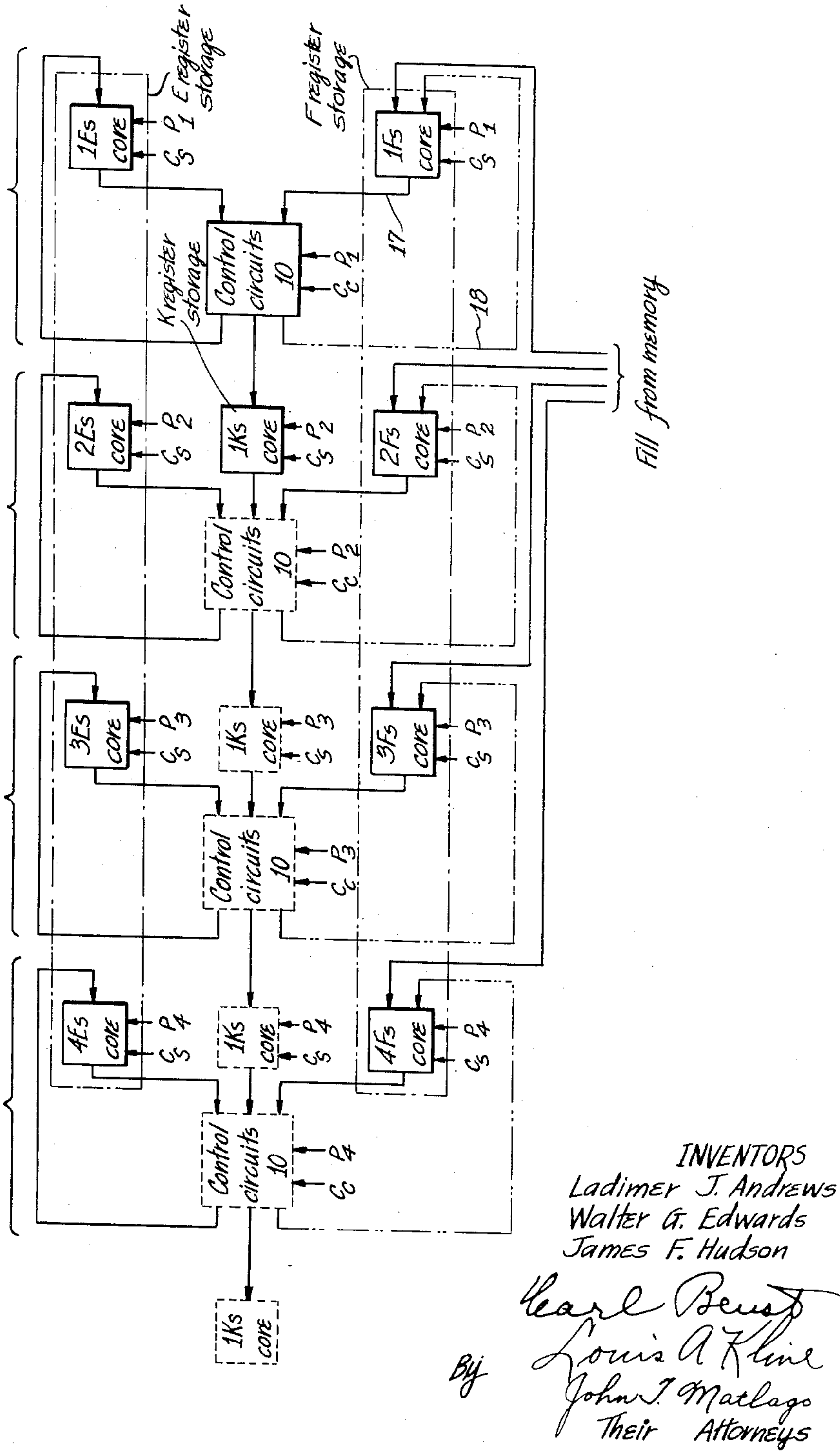
FIG. 1 is a block diagram of a serial adder which is constructed in accordance with the techniques of the present invention.

Referring now to FIG. 1 of the drawings, there may be seen an operational diagram of a serial adder to which the teachings of the present invention may be adapted. Included in this diagram are the designations of the element which will be later shown to accomplish the operation in a preferred circuit embodiment.

The adder illustrated comprises means to add into an accumulator, the E register storage, order by order, a binary number set up as an addend in the F register storage, taking into account the carry-in binary digit from the previous order, as stored in the K register storage. Four-place binary numbers will be considered, although it should be understood that the principles to be developed are adaptable to binary numbers of any length within the handling capacity of the digital computer of which the adder may form a part. It should further be understood that, in a computer embodiment, the number of register cores and the number of conductors coupling to the individual core might be greater than shown if a variety of logical functions are to be synthesized so that they can be serially carried out on a time-sharing basis in accordance with a scheme of computer operations such as is commonly represented by a flow diagram. To illustrate the invention, therefore, the present showing comprises extracts of equipment relevant to the operation of addition.

For simplicity, it will be assumed that initially the storage cores of the E and K registers are cleared and that the F register has been filled with digits from a computer memory, for example. The designations $P_1$, $P_2$, $P_3$, and $P_4$ denote signals representing "digit transfer cycles." These signals define sequential cycle timing periods during each of which one of the orders $2^0$, $2^1$, $2^2$, $2^3$ in the addition takes place. Thus, the first serial operation, occurring during the first digit transfer cycle, for which signal $P_1$ is effective, is the addition utilizing control circuits 10 of the least significant digit ($2^0$ order) of the addend, as stored in core 1F*s*, to the least significant digit ($2^0$ order) of the augend, as stored in core 1E*s*, to form the least significant digit ($2^0$ order) of the sum. The sequence of core "interrogation" and "set" within the digit transfer cycle, as already outlined, is determined by clock signals $C_s$ and $C_c$, the former shown entering all storage cores and the latter shown entering control circuits 10. The clock signals $C_s$ and $C_c$ each combine with the digit selector signal $P_1$, which latter signal passes through both the storage and control cores of the $2^0$ order, to properly sequence the operations to be performed during each lowest order digit transfer cycle. The sum digit is set up in core 1E*s* and any resultant inter-order carry is stored in core 1K*s*. The digit previously stored in core 1F*s* of the F register is reset therein, as will also be done during higher-order additions. That is to say, the F register information, in the present embodiment, is recirculated or restored, i.e., information read out of, for instance, core **1F*s*, via line 17 is reset therein via line 18**. This need not necessarily characterize other embodiments wherein it may be desired to clear the F register (set all storage cores thereof false) or enter other information into the F register during the addition operation.

The remainder of the four-place addition is handled by control circuits 10 sequentially as determined by digit selector signals $P_2$, $P_3$, and $P_4$, to produce the ultimate sum in the accumulator (E register storage cores **1E*s* to 4E*s*), any carry-out in storage core 1K*s* of the K register, and the prior addend in storage cores 1F*s* to 4F*s*** of the F register.

Referring next to FIG. 2, there is presented the schematic of a serial adder operative in accordance with the diagram of FIG. 1 and embodying the principles of the invention.

The three registers comprising the adder are designated the E, F, and K registers, and all are connected to period signal generator 16 and to driver signal generators 38, 39, and 40. All of these generators are driven from a common pulse source 15. The E, F, and K registers each includes a plurality of magnetic cores and a transfer circuit 22, 23, or 24, respectively. As shown, the magnetic cores arranged in the E, F, and K registers may be considered in each case to form two sections, a storage section comprising groups 25, 26, and 27, and a control section comprising groups 28, 29, and 30, respectively. It may be noted that the number of cores is different for various ones of the sections. Thus storage section 27 (K register) and control section 29 (F register) are comprised of but a single core each, control section 30 (K register) is comprised of three cores and the remaining sections are comprised of four cores each. It will be later shown that the number of cores required for a storage section corresponds to the number of binary digits to be stored in the register while the number of cores required for a control section corresponds to the number of sum terms of the composite logical equation describing the operation of the register of which the control section is a part.

A plurality of conductors passes through the cores of the registers. Conductors 35, 36, and 37 supply pulse-type signals into the cores from control clock signal generator 38, digit selector signal generator 39, and storage clock signal generator 40, respectively. It may be seen that conductor 35 is impressed with control clock signal $C_c$, that conductor 37 is impressed with storage clock signal $C_s$, and that the four conductors designated 36, for simplicity, are each impressed with one of the digit selector signals $P_1$, $P_2$, $P_3$, and $P_4$. Sense conductors 47, 48, and 49 each pass through all cores of only one register and carry pulse type signals from the cores to transfer circuits 22, 23, and 24, respectively. Conductors 41 to 46, inclusive, return pulse type signals from transfer circuits 22, 23, and 24 to the cores of all the registers.

In threading through the core array of a register, the aforementioned conductors may be inductively coupled to a core or may entirely by-pass a core. Coupling to a core is by means of a single winding about the core material in a direction such that, in the case of conductors supplying signals into the cores, a signal appearing on the conductor will contribute to changing the core state in a prescribed direction and, in the case of sense conductors carrying signals out of the cores, a change in core state will induce a signal on the conductor. It may be pointed out that the well-known device of reversed phase winding of sense conductors on successive cores could be employed to maximize the cancellation of "shuttle" voltages induced by half-select currents affecting cores not fully selected.

Figure 3:
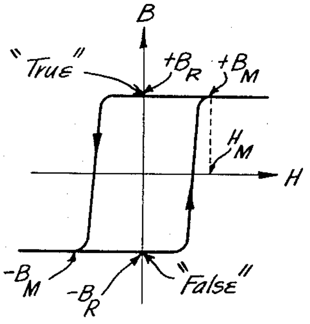
FIG. 3 shows a hysteresis loop of the magnetic material employed in the core switches.

The magnetic material, of which each core is composed, is distinguished preferably by having a rectangular major hysteresis characteristic, i.e., B–H curve, such as the one shown in FIG. 3. The states of bistability previously referred to prevail after core saturation, and are the two polarities of core remanent magnetization, here designated "true" and "false," which will characterize the core indefinitely if no further energy is applied.

The excitation, $H_M$, required to drive a core from one state of saturation, e.g., $-B_M$, to the other, e.g., $+B_M$, is critical, and the application of less than this critical excitation, although causing nominal excursion, nevertheless does not essentially change the previously polarity of saturation. However, upon the application of excitation at least equal to the critical value in a direction to cause the core to take on a polarity of saturation opposite to that presently existing, the polarity of saturation will abruptly "switch," as from the true state to the false state along the path of the descending arrow or from the false state to the true state along the path of the ascending arrow.

Referring again to FIG. 2, in the present system, each of the conductors supplying signals to the registers is connected to circuitry capable of generating a "half-current" of energy, i.e., half the excitation required to change the state of the core, or no excitation, i.e., zero current, at a particular time. Such conductors, which pass through and couple a core with the same electrical sense so that currents therein are cumulative in their effect on the core polarity, are so indicated by diagonal marks across the cores in the same direction, such as diagonals 50 and 51. Such conductors which are poled oppositely to these are indicated by diagonal marks of opposite slope, such as diagonal 52.

Switching, therefore, is done by the coincident application of half-currents from two sources. As previously stated, these sources are a clock signal $C_s$ or $C_c$, and a digital selector signal $P_1$, $P_2$, $P_3$, or $P_4$. Further, core switching may be prevented by the application, coincident with the above, of a half-current from one or another of several other sources, i.e., an "inhibiting" signal from one of transfer circuits 22, 23, or 24.

A core, if in the true state, will be switched to the false state by half-currents in the same direction, right to left in FIG. 2, on one of the conductors 36 and on conductor 35 or conductor 37. A core, if false, will be switched true by coincident half-currents from left to right, unless otherwise inhibited. If it is understood that currents from left to right are positive and those from right to left are negative, it may be seen that, for core **1E*s*, for instance, only a positive half-current on each of the conductors carrying signals $P_1$ and $C_s$ flowing simultaneously can switch the core to the true state, and conversely only a negative half-current on each of these conductors flowing simultaneously can switch the core to the false state. It will be further understood that, when a core is to be interrogated, it is supplied an uninhibited full negative current so that its resulting condition is the false state; and, that when a core is to be set, it is supplied an uninhibited full positive current so that its resulting condition is the true state. Thus it follows that a negative half-current emitted simultaneously from storage clock signal generator 40 and from digit selector signal generator 39 can interrogate storage cores while a positive half-current emitted simultaneously from these generators can set storage cores. Similarly, a positive half-current emitted simultaneously from control clock signal generator 38 and from digit selector signal generator 39** can set control cores while a negative half-current emitted simultaneously from these generators can interrogate control cores.

With further reference to terminology to be employed herein, it will also be noted that a core in the true state will be considered to be storing a binary digit "one" and this state for core **1E*s***, for instance, will be symbolically denoted $1E_s$, while a core in the false state will be considered to be storing a binary digit "zero" and this state for core 1E*s*, for instance, will be symbolically denoted $1E_s'$. When defined in its Boolean notation, i.e., in terms of the outputs of the transfer circuits, the signal required to set this core to the true state will be designaed as $1e_s$, while the signal required to interrogate this core to the false state, which in the present embodiment occurs at the end of every $W_s$ period, will be designated as $_01e_s$.

FIG. 2 further indicates that the signals generated by digit selector signal generator 39, control clock signal generator 38 and storage clock signal generator 40 are synchronized via common pulse source 15, which may be a multivibrator or the like capable of operation at about a 400 kc. repetition rate. Such sources are familiar and will not be detailed here.

Additionally, it is observed that an "or" gate 20 is supplied with signals $W_c$ and $W_s$ by period signal generator 16. Generator 16 comprises a network, the outputs of which are square wave signals ranging from 0 to −10 volts in amplitude synchronized to appear on the respective lines during periods $W_c$ and $W_s$. This type of arrangement is also well-known and will not be further discussed.

Figure 4:
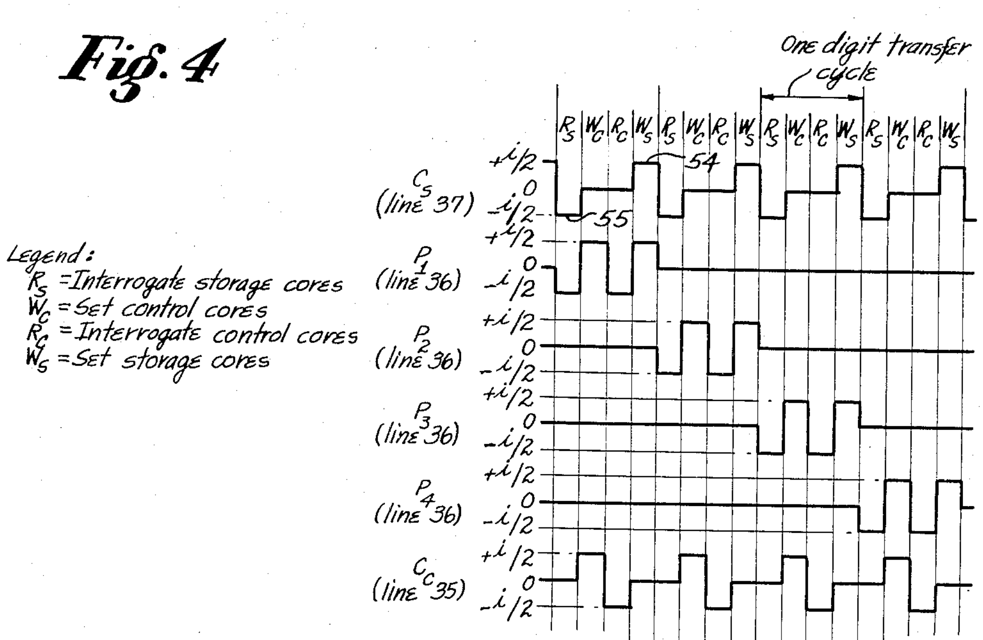
FIG. 4 shows a group of waveforms used for serially sequencing the operation of the adder circuits shown in FIG. 2.

Referring now to FIG. 4, here is shown the group of timing current waveforms, which, when generated synchronously, are capable of sequentially interrogating and setting cores through which the conductors carrying these signals are passed. Each is a square waveform of current having maximum values, such as at regions 54 and 55 of the signal $C_s$ wave, equal to the positive or negative half-current. These maximum values, for each case, exist for a time period somewhat in excess of the switching time required by the core material, and the phasing of the currents in such that a core is interrogated at a coincidence of negative half-current of signal $C_s$ or $C_c$ with a negative half-current of signal $P_1$, $P_2$, $P_3$, or $P_4$, and is set at a coincidence of positive half-current of signal $C_s$ or signal $C_c$ with a positive half-current of signal $P_1$, $P_2$, $P_3$, or $P_4$. Both coincidences occur twice during the digit transfer cycle, the periods of the occurrence of the former being designated $R_s$ (affecting a storage core) and $R_c$ (affecting a control core) and the periods of the occurrence of the latter being designated $W_c$ (affecting a control core) and $W_s$ (affecting a storage core).

Figure 5:
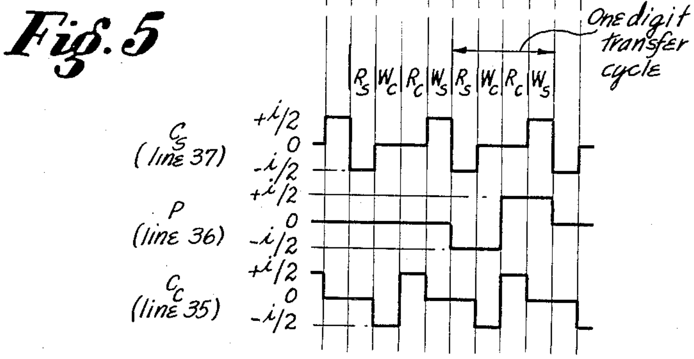
FIG. 5 shows an alternate group of waveforms to those of FIG. 4.

FIG. 5 shows an alternate set of waveshapes which will accomplish the same sequence of interrogation and setting of cores. In this figure, for simplicity, signals $P_1$, $P_2$, $P_3$, and $P_4$ are generically designated as signal P. With this arrangement, however, it should be noted that the sense of the P and $C_c$ windings through control cores would be required to be opposite to the sense required by the waveshapes of FIG. 4. In other words, a coincidence of negative half-currents can set a control core while a coincidence of positive half-currents can interrogate a control core.

Figure 6:
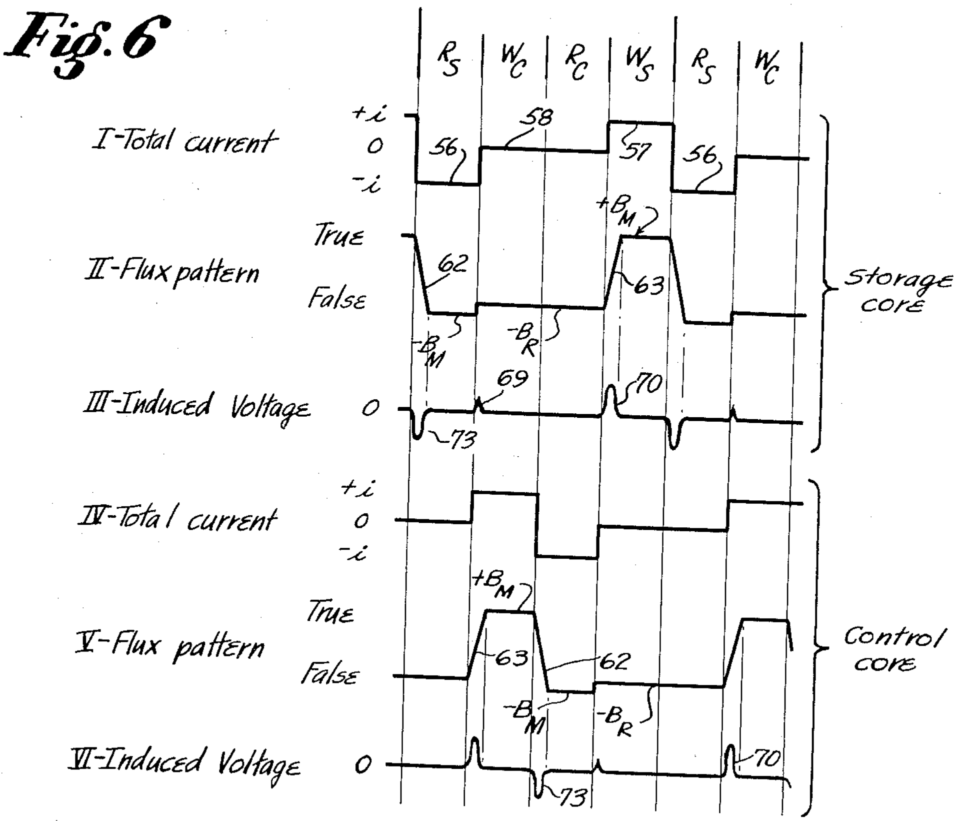
FIG. 6 shows a group of waveforms representing the core flux pattern and the induced voltage in the core sense conductor caused by the application of a magnetomotive force of switching amplitude.

FIG. 6 presents a group of waveforms illustrating the effect on core state of the application of magnetomotive force of switching amplitude, i.e., a full current flowing through core windings. Line I shows the total current applied to a storage core, such as core 1Es (FIG. 2) during a digit transfer cycle (FIG. 4), assuming that no inhibiting currents are present. It is seen that a negative full-current amplitude 56 exists during period $R_s$, a positive full-current amplitude 57 exists during period $W_s$, and zero current amplitude 58 exists during periods $W_c$ and $R_c$. The resulting flux pattern for a prior true condition of the core is shown in line II. It is evident that the flux pattern variations, such as fall 62 and rise 63, are along the hysteresis loop (FIG. 3) in accordance with change in current amplitude. Line III is a graph of the voltage induced on conductor 47 of core 1E*s* (FIG. 2) as a result of the changing flux pattern. It is noted that phasing is arranged such that a negative full-current amplitude 56 (line I), in interrogating a core to the false state, causes the induction of negative voltage pulse 73, while a positive full-current amplitude 57, in setting a core to the true state, causes the induction of positive voltage pulse 70. In line III, low-level induced voltages such as pulse 69 are also produced when core magnetism changes from saturation $B_M$ to remanence $B_R$. Lines IV, V, and VI present similar curves for a control core, such as core 1E*c* (FIG. 2).

The art is well versed in techniques for generating square wave signals of current, such as signals $C_s$, $C_c$, and $P_1$ to $P_4$, inclusive. It should therefore suffice to point out that each of these is a recurrent square waveshape with excursions of half-current amplitude, when present on their respective lines. It should be noted that the waveshapes of FIG. 4 will be used for illustration herein. It should also be noted that signal $C_c$ is identical to signal $C_s$, but is shifted two periods with respect thereto, and that each of these signals is at the zero current level for half of the digit transfer cycle, all as indicated in FIGURES 4 and 5. Further, it should be observed that signals $P_1$, $P_2$, $P_3$, and $P_4$ appear successively on their respective conductors, but whichever is presently effective is synchronized with the generation of signals $C_s$ and $C_c$, as shown. Thus, it follows that in the exemplary apparatus each of these P signals prevails only during every fourth digit transfer cycle, but is equally effective in establishing, by combining with $C_s$ and $C_c$, the four iterative periods $R_s$, $W_c$, $R_c$, and $W_s$.

It has been pointed out in connection with FIG. 2 that pulse voltages induced on sense conductors 47, 48, and 49, as a result of change in core state, comprise the inputs to transfer circuits 22, 23, and 24, respectively, and that the transfer circuits are identical. These circuits will now be described with reference to the E register transfer circuit 22 shown in FIG. 7.

Voltage pulses carried by conductor 47 provide an input to amplifier 60. The phase of each of these pulses is negative, owing to the direction of threading conductor 47 through the cores. Amplifier 60 is gated by a second input signal $W_c+W_s$ from "or" gate 20. This latter signal has the ability to cut off conduction in amplifier 60 during periods $W_c$ and $W_s$ and, thus, only signals on line 47 which occur during periods $R_s$ and $R_c$ appear in amplified form on line 61. Line 61 connects as one input line to flip-flop E1, and the signal on the line is designated as input $e_1$. Flip-flop E1 is constructed in accordance with the familiar arrangement which permits triggering from one of its bistable states to the other by only negative-going voltage pulses applied alternatively to a pair of inputs. Input $e_1$ thus has the ability to set this flip-flop to the true state. Flip-flop E1 is set to the false state by an input $_0e_1$, represented by the logical sum $W_c+W_s$. The actual triggering occurs as a result of the negative pulse produced by differentiating the fall of these waveforms, i.e., at the termination of either of the periods $W_c$ or $W_s$ by conventional $R=C$ differentiating circuits as shown at 76 in FIGURE 10. Thus, flip-flop E1 may be triggered true during periods $R_s$ and $R_c$ as a result of a change in state of one of the E register cores; and, if so, this state will prevail until the end of periods $W_c$ and $W_s$, respectively.

Flip-flop E1 is characterized by two outputs. One output, $E_1$, on line 74, is high only when the flip-flop is in the true state and the other output, $E_1'$, on line 66, is high only when the flip-flop is in the false state. Both outputs are amplified and inverted by identical amplifiers, the former by amplifier 72 and the latter by amplifier 71. Considering amplifier 71 as exemplary, it is seen that its input is also gated by signal $W_c+W_s$. However, due to the circuit arrangement of amplifier 71, a signal on line 66 is passed only during periods $W_c$ and $W_s$, and conduction is cut off during periods $R_s$ and $R_c$. The output of amplifier 71, also designated as output $E_1$, is employed as the input on line 65 to driver-amplifier 68. Driver-amplifier 68 provides a current output on line 42 in phase with its input, this current being of half core-switching amplitude $i/2$ and is also designated as $E_1$. Driver-amplifier 67 is identical to driver-amplifier 68 and provides a current output $i/2$ on line 41 when provided with an input, i.e., when flip-flop E1 is in the false state during periods $W_c$ and $W_s$. Thus one of the transfer circuit output half-currents, $E_1'$ and $E_1$, on conductors 41 and 42, respectively, may appear only during periods $W_c$ and $W_s$. Conductors 41 and 42 pass through the register cores (FIG. 2), being coupled to selected cores so that these signals may inhibit the setting of the cores.

FIG. 7*a* contains curves which further illustrate the operation of transfer circuit 22 for two representative digit transfer cycles. The successful interrogation of E register cores will be assumed during two successive interrogation periods, $R_c$ and $R_s$, resulting in the shown negative pulses 80 and 82 of the $e_1$ wave on line 61 (FIG. 7). Amplifier 60 (FIG. 7) is active during these periods and thus pulses 80 and 82 provide true triggering pulses 84 and 86, respectively, for flip-flop E1. However, at the end of every set period, i.e., at the fall of pulses $W_c$ and $W_s$, such as 87, 88, and 89, false triggering pulses are produced, such as pulses 90, 91, and 92, respectively, which reset flip-flop E1 to the false state. Output $E_1$ on line 74 becomes high in potential coincident with pulses 84 and 86 and becomes low in potential coincident with pulses 91 and 92, and output $E_1'$ on line 66 becomes low in potential coincident with pulses 84 and 86 and high in potential coincident with pulses 91 and 92, respectively. Since amplifiers 71 and 72 are cut off during interrogation periods, it is during period $W_s$ of the first digit transfer cycle and period $W_c$ of the second digit transfer cycle that output $E_1$ on line 65 is high and output $E_1'$ on line **65*a* is low in potential. It follows that output $E_1$, on line 42, is likewise high and output $E_1'$, on line 41, is likewise low in potential during these periods. Thus, as a result of a change of state of an E register control core during period $R_c$ of the first digit transfer cycle, for instance, an inhibiting signal half-current 93 ($E_1$) is supplied on line 42 at the output of the E register transfer circuit 22 during the next period $W_s$; but when there is no change of state of an E register control core, as during period $R_c$ of the second digit transfer cycle, there is an inhibiting signal half-current 94 ($E_1'$) supplied on line 41** at the output of the E register transfer circuit during the next period $W_s$.

FIG. 8 shows "or" gate 20, which generates the logical sum $W_c+W_s$ fed as input to transfer circuits 22, 23, and 24. Inputs $W_c$ and $W_s$ to "or" gate 20 will be understood to comprise square wave signals clamped between the potentials 0 and −10 volts. This circuit is well known to operate such that the output signal $W_c+W_s$ is at the −10 volt level unless one or both of the inputs $W_c$ or $W_s$ is at the 0 volt level, for which case the output signal $W_c+W_s$ will also be at 0 volts. The generation of inputs to these networks is by combining the outputs of a pair of flip-flops, the inputs to which are triggered in synchronism with signal $C_s$. Since the circuits for generating such inputs are familiar to practitioners of the art, they will not be further discussed, and the symbols $R_s$, $W_c$, $R_c$, and $W_s$ will serve to designate the periods of the digit transfer cycle.

The details of the circuits comprising transfer circuits 22, 23, and 24 will next be described with reference to E register transfer circuit 22 of FIG. 7.

Amplifier 60 is schematically shown in FIG. 9 to be a single stage amplifier with two inputs. One input is provided on conductor 47, on which a negative voltage pulse appears whenever a core of the E register changes state. This input is coupled to the base of transistor 59 in accordance with the indicated polarity by means of transformer 64. The other input, from "or" gate 20, is connected to the emitter of transistor 59 and operates to cut off transistor 59 when the emitter is of positive polarity with reference to the base, i.e., during periods $W_s$ or $W_c$, at which times this input is at 0 volts. Thus, a pulse on line 47, produced by a change in state of an E register core, is passed through amplifier 60 during only periods $R_s$ or $R_c$ and is reproduced on line 61 as input $e_1$ to flip-flop E1. The gain through amplifier 60 is such that an output pulse will be of 10 volts amplitude below reference ground potential. In summary then, the output of amplifier 60 on line 61 comprises an amplified negative-going reproduction of any negative-going input pulse of sufficient amplitude applied during periods other than $W_c$ and $W_s$. As is well known, transistor 59 possesses the inherent property of discriminating against low-level induced voltages such as pulses 69 of line III of FIG. 6 caused by a core state changing from a condition of saturation to a condition of remanent magnetization. It is desired that only pulses such as pulse 73 of line III, caused by core switching, be passed through amplifier 60.

It is thus seen that the true input $e_1$ to flip-flop E1 comprises only negative-going pulses which may occur only during periods $R_s$ or $R_c$.

Flip-flop E1, shown schematically in FIG. 10, is seen to be of conventional design, having a pair of transistors cross-coupled so as to maintain one mode of conduction until triggered by a negative-going pulse applied to the base electrode of the conducting transistor, at which time the other mode of conduction will prevail. To illustrate, if flip-flop E1 is false, i.e., output $E_1$ on line 74 is at −8 volts and output $E_1'$ on line 66 is at +2 volts, a negative-going pulse $e_1$ on line 61 will cause output $E_1$ to abruptly rise in potential to +2 volts and, simultaneously, output $E_1'$ will fall to the −8 volt level. Flip-flop E1 is thus triggered into the true state, and will remain in this state until triggered false by a negative-going pulse ${}_0e_1$ which will occur at the termination of periods $W_c$ or $W_s$.

Outputs $E_1$ and $E_1'$ of flip-flop E1 are each amplified and inverted in amplifiers 72 and 71, respectively. These amplifiers are identical and for purposes of illustration, the latter is shown in FIG. 10*a*.

Amplifier 71 is seen to provide single stage amplification of an input on line 66, gated to pass the input only when the emitter of transistor 75 is at the 0 volt level, i.e., only during periods $W_c$ or $W_s$. The output on line 65 is clamped at the −10 volt level during periods $R_s$ or $R_c$ and will rise to 0 volts during periods $W_c$ or $W_s$ only if flip-flop E1 is false.

FIG. 11 shows driver-amplifier 68, a conventional two-stage amplifier which serves as a source for the relatively high half-currents required for inhibiting the switching of cores. Input is on line 65 from amplifier 71 (FIG. 10*a*) and the output, in phase therewith, is also designated as signal $E_1$ and appears on conductor 42 which threads through the registers (FIG. 2). Driver-amplifier 67 of FIG. 7 is identical in all respects to driver-amplifier 68 and provides the inhibiting signal output designated $E_1'$ on conductor 41.

In summary, transfer circuits 22, 23 and 24 (FIG. 2) supply half-current inhibiting signals to the E, F, and K registers in accordance with a prescribed scheme, as follows. If a core changes state during an interrogation period (period $R_s$ or $R_c$), an inhibiting signal appears during the following set period (period $W_c$ or $W_s$) on the transfer circuit true output conductor 42, 44, or 46 of the register containing the core; if no core changes state during an interrogation period, then an inhibiting signal appears during the following set period on the transfer circuit false output conductor 41, 43, or 45, respectively; and, finally, any changes in state of a core during the set periods are ineffective in that they are prevented from entering the transfer circuit.

An examination of the arrangement of the wiring of the cores in the registers of FIG. 2 will show that the cores can be affected by various transfer circuit inhibiting signals generated during set periods $W_c$ and $W_s$ of a digit transfer cycle. The following tables I*a*, I*b*, and I*c* list the cores for each of the registers and indicate the inhibiting signal outputs of the transfer circuits with which each core is wound. The tables also show the periods that the inhibiting signals noted are able to affect the setting of the cores.

It should be noted that the control cores of a register always reside in a "zero" state prior to period $W_c$ and can be set into a "one" state at every $W_c$ period if none of the inhibiting signals with which they are wound are effective, i.e., high in potential during $W_c$.

It should be further noted that the selected storage cores of the register also are all in a "zero" state prior to period $W_s$, the ones stored therein having been read out during the previous $R_s$ period, and thus each of these cores can be set into a "one" state during a P selected $W_s$ period if none of the inhibiting signals with which they are wound are effective, i.e., high in potential during $W_s$.

*Table Ia—E Register*

| | Cores | Signals which can inhibit setting of cores | Period setting of core can occur |
|---|---|---|---|
| Control | 1Ec | $E_1'$; $F_1'$; $K_1'$ | $W_c$ |
| | 2Ec | $E_1'$; $F_1$; $K_1$ | $W_c$ |
| | 3Ec | $E_1$; $F_1'$; $K_1$ | $W_c$ |
| | 4Ec | $E_1$; $F_1$; $K_1'$ | $W_c$ |
| Storage | 1E*s* | $E_1'$ | $P_1W_s$ |
| | 2E*s* | $E_1'$ | $P_2W_s$ |
| | 3E*s* | $E_1'$ | $P_3W_s$ |
| | 4E*s* | $E_1'$ | $P_4W_s$ |

*Table Ib—F Register*

| | Cores | Signals which can inhibit setting of cores | Period setting of core can occur |
|---|---|---|---|
| Control | 1Fc | $F_1'$ | $W_c$ |
| Storage | 1F*s* | $F_1'$ | $P_1W_s$ |
| | 2F*s* | $F_1'$ | $P_2W_s$ |
| | 3F*s* | $F_1'$ | $P_3W_s$ |
| | 4F*s* | $F_1'$ | $P_4W_s$ |

*Table Ic—K Register*

| | Cores | Signals which can inhibit setting of cores | Period setting of core can occur |
|---|---|---|---|
| Control | 1Kc | $E_1'$; $F_1'$ | $W_c$ |
| | 2Kc | $E_1'$; $K_1'$ | $W_c$ |
| | 3Kc | $F_1'$; $K_1'$ | $W_c$ |
| Storage | 1K*s* | $K_1'$ | $W_s$ |

The periods of a transfer cycle occur, as previously described, in the following order: $R_s$, $W_c$, $R_c$, and $W_s$. Thus, in illustration, with reference to the E register cores shown in Table I*a*, it should first be noted that cores 1E*s* will go true, i.e., store a "one," at period $P_1W_s$ unless inhibiting signal $E_1'$ is generated at period $P_1W_s$. Signal $E_1'$ will not be generated at period $W_s$ if at least one of the cores 1E*c* to 4E*c*, inclusive, was successfully interrogated, i.e., a digit one was read out, at the previous period $P_1R_c$. Therefore, one of these control cores must be set at period $P_1W_c$ in order to enable cores 1E*s* to be eventually set true during period $P_1W_s$.

This description applies to each of the remaining cores 2E*s*, 3E*s*, and 4E*s*, realizing that these cores are selected one at a time by signals $P_2$, $P_3$, and $P_4$, respectively, to become operative, in turn, with all of the control cores 1E*c* to 4E*c*, inclusive, comprising the E register logic.

The sequential operation of the circuit elements of FIG. 2 will now be generally analyzed for the first digit transfer cycle of an addition, $P_1$, in which the final state of core 1E*s* (partial sum) will be shown to be a function of the initial states of the cores 1E*s* (augend), 1F*s* (addend), and 1K*s* (carry), as shown in Table I*a*. It will be noted that a core in the true state is considered to be storing a "one" and a core in the false state is considered to be storing a "zero."

For core 1E*c* to be set at period $W_c$, inhibiting signals $E_1'$, $F_1'$, or $K_1'$ (Table I*a*) must not be generated. Therefore, it is only if all three cores 1E*s*, 1F*s*, and 1K*s* are true at period $R_s$, that core 1E*s* will be true at the end of the digit transfer cycle: $1e_s=1E_s1F_s1K_s$. In other words, taking into account only control core 1E*c*, it is only if cores 1E*s*, 1F*s*, and 1K*s* are all initially storing "ones" that core 1E*s* will ultimately store a "one."

For core 2E*c* to be set at period $W_c$, inhibiting signals $E_1'$, $F_1'$, or $K_1$ must not be generated. Therefore, it is only if core 1E*s* is true and cores 1F*s* and 1K*s* are false at period $R_s$ that core 1E*s* will be true at the end of the digit transfer cycle: $1e_s=1E_s1F_s'1K_s'$. Stated in other words, taking into account only control core 2E*c*, if core 1E*s* is initially storing a "one" and cores 1F*s* and 1K*s* are initially storing "zeros," then core 1E*s* will ultimately store a "one."

For core 3E*c* to be set at period $W_c$, inhibiting signals $E_1$, $F_1'$, or $K_1$ must not be generated. Therefore, it is only if core 1F*s* is true and cores 1E*s* and 1K*s* are false at periol $R_s$ that core 1E*s* will be true at the end of the digit transfer cycle: $1e_s=1E_s'1F_s1K_s'$. In other words, taking into account only control core 3E*c*, if core 1F*s* is intially storing a "one" and cores 1E*s* and 1K*s* are initially storing "zeros," then core 1E*s* will ultimately store a "one."

For core 4E*c* to be set at period $W_c$, inhibiting signals $E_1$, $F_1$, and $K_1'$ must not be generated. Therefore, it is only if core 1K*s* is true and cores 1E*s* and 1F*s* are false at period $R_s$ that core 1E*s* will be true at the end of the digit transfer cycle: $1e_s=1E_s'1F_s'1K_s$. In other words, taking into account only control core 4E*c*, if core 1K*s* is initially storing a "one" and cores 1E*s* and 1F*s* are initially storing "zeros," then core 1E*s* will ultimately store a "one."

The four partial addition terms may be combined to form the complete expression for the conditions for which a digit ultimately established in the core 1E*s* will be a "one:"

$$1e_s=1E_s1F_s1K_s+1E_s1F_s'1K_s'+1E_s'1F_s1K_s'+1E_s'1F_s'{}_sK_s$$

This overall expression is interpreted as meaning that core 1E*s* will ultimately store a one if all three cores 1E*s*, 1F*s*, and 1K*s* are already each storing a one or if any one of them is already storing a one.

It should be obvious that the same derivation also will describe the state of the other orders of the final sum since, in a register, all control cores cooperate to determine the state of each storage core in turn. If, therefore, the general symbols E*s*, F*s*, and K*s* are employed to designate the E, F, and K register storage cores devoted to any one order, the above expression becomes:

$$e_s=E_sF_sK_s+E_sF_s'K_s'+E_s'F_sK_s'+E_s'F_s'K_s$$

FIG. 14 presents the generalized adder truth table and it is noted that the arrangement of control cores and inhibiting windings in FIG. 2 is in accordance with the adder expressions derivable from the table and shown therewith.

The logical function of addition will next be particularly described with reference to FIGS. 12 and 13 which exemplify the activity of the elements of FIG. 2.

FIG. 12 shows an example of the addition of the binary number 1011, which is the addend stored in the F register, to the binary number 0110, which is the augend stored in the E register. The incoming carry, 0, is stored in the K register. The four lower order digits of the sum 10001 will be established in the E register, the addend, 1011, will be re-established in the F register and the outgoing carry, 1, will be set up in the K register. Inter-order carries generated by the partial additions for the $2^0$, $2^1$, and $2^2$ orders will, temporarily, also be set up in the K register as the addition proceeds.

FIG. 13 contains line graphs of the waveshapes describing the activity of circuit elements of FIG. 2 in the accomplishment of the addition of FIG. 12.

As already pointed out, four digit transfer cycles are required to add the four place binary addend into the accumulator, the digits of the $2^0$ order being added during cycle $P_1$, the digits of the $2^1$ order being added during cycle $P_2$, etc. The digits of each order are stored in separate storage cores, the digits of the $2^0$ order being stored in cores 1E*s* and 1F*s*, the digits of the $2^1$ order being stored in cores 2E*s* and 2F*s*, etc. During cycle $P_1$, then, the digit in core 1F*s* is added to the digit in core 1E*s*, the sum digit is established in core 1E*s*, the inter-order carry is established in core 1K*s*, and the digit originally in core 1F*s* is re-established therein.

Thus referring to period $R_s$ of cycle $P_1$, in the graph of FIG. 13, the waveforms show that during this $R_s$ period a digit 0 is read out of core 1E*s*, a digit 1 is read out of core 1F*s*, and a digit 0 is read out of core 1K*s*. As a result of reading these digits out, the $E_1'$, $F_1$, and $K_1'$ inhibiting outputs of transfer circuits 22, 23, and 24, respectively, are each high in potential, as shown, during period $W_c$. The control cores of the registers, as shown in FIG. 2, are so wound that, for this combination of effective inhibiting signals, core 3E*c* in the E register and core 1F*c* in the F register are not inhibited and therefore are set into a 1 state during period $W_c$. Thus the reading of these control cores during period $R_c$ results in the $E_1$, $F_1$, and $K_1'$ inhibiting outputs of the respective transfer circuits being high in potential during period $W_s$. These effective inhibiting signals therefore function to set, during period $W_s$, a 1 representative of the sum digit ($2^0$) in core 1E*s* of the E register, to set a 1 which was read out of core 1F*s* of the F register back into this core, and to leave core 1K*s* in a 0 state representative of a 0 carry digit.

The operation of the circuits during cycle $P_2$, during which the digit in core 2F*s* is added to the digit in core 2E*s*, taking into account the incoming carry digit in core 1K*s*, can be similarly followed in the graph of FIG. 13. Thus, referring to the waveform for cycle $P_2$ in the graph of FIG. 13, the waveforms indicate that during period $R_s$ of this cycle a digit 1 is read out of core 2E*s*, a digit 1 is read out of core 2F*s*, and a digit 0 is read out of core 1K*s*. As a result of reading these digits out, the $E_1$, $F_1$, and $K_1'$ inhibiting outputs of transfer circuits 22, 23, and 24, respectively, are each high in potential, as shown, during period $W_c$. The control cores of the registers, as shown in FIG. 2, are so wound that, for this combination of effective inhibiting signals, core 1F*c* and core 1K*c* are not inhibited and therefore are set into a 1 state. Thus the reading of these control cores during period $R_c$ results in the $E_1'$, $F_1$, and $K_1$ inhibiting outputs of the respective transfer circuits being high in potential during period $W_s$. These effective inhibiting signals function to set a 0 representative of the sum digit ($2^1$) in core 2E*s* of the E register, to set a 1 which was read out of core 2F*s* of the F register back into this core, and to set core 1K*s* into a 1 state representative of a carry digit.

The operation of the circuits for adding the higher order digits can be similarly explained by referring to the waveforms of the graph in FIG. 13 for the $P_3$ and $P_4$ cycles.

With reference to the restoration of the information in the F register as exemplified by the circuit of FIG. 2, it should now be clear that the system of the present invention is in no way limited to this type of operation. To illustrate, assume that it is desired that the F register be filled with "zeros" (cores 1F*s* to 4F*s* false) at the completion of the addition. For this to be accomplished, it is only necessary that the inhibiting signal $F_1'$ be permitted to affect only cores 1F*s* to 4F*s*, control core 1F*c* not being required at all. With this circuit arrangement, regardless of the initial state of cores 1F*s* to 4F*s*, when the addition is completed, these cores will be false (i.e., filled with "zeros").

Further, since, in the binary number system, "ones" complementing requires only the replacement of "ones" with "zeros" and "zeros" with "ones," the addend originally stored in the F register can easily be modified to its "ones" complement during the addition if, for instance, a subsequent computer operation involves a subtraction. This is accomplished simply by utilizing the opposite outputs $F_1$ and $F_1'$ of transfer circuit 23 as inhibiting signals, one for storage cores 1F*s* and 4F*s* and the other for control core 1F*c*. With this circuit arrangement, regardless of the initial state of a storage core, its state at the end of its corresponding digit transfer cycle will be the opposite.

It is noted from these illustrations that either output of a transfer circuit is equally efficient in providing the inhibiting signal as long as the transfer circuit operating specifications already mentioned are preserved. It is thus evident that a wide choice of selection of inhibiting signals is permitted and a circuit for mechanizing a logical expression may be arranged utilizing the most convenient selection of inhibiting signals.

In general, the system of the present invention permits the mechanization of any Boolean equation. For illustration, observation is directed to FIG. 14*a*, which is the K register control logic circuitry. With specific reference to the mechanization of, for instance, the $k_s$ equation given in FIG. 14:

$$k_s=E_sF_s+E_sK_s+F_sK_s$$

The equation is seen to comprise the sum of three product terms and may be logically manipulated to the equivalent expression:

$$k_s=(E_s'+F_s')'+(E_s'+K_s')'+(F_s'+K_s')'$$

Core 1K*c* of FIG. 2, then, is seen to mechanize the sum $(E_s'+F_s')$ since the false outputs of the E and F register transfer circuits 22 and 23 are inhibit wound in this core. Similarly, core 2K*c* mechanizes the sum $(E_s'+K_s')$ and core 3K*c* mechanizes the sum $(F_s'+K_s')$. The primes of these sums are mechanized by the inhibit type of winding in which currents act to cancel the effect of currents in the clock and digit selector signal windings 35 and 36, and the formation of the final sum is accomplished by the common sense winding 49. Thus, consider the transfer circuit output propositions which are effective in the K register control cores during, for instance, period $W_c$ of cycle $P_2$ (FIG. 13). Here the inhibiting output $K_1'$ is shown to have a positive square wave current signal impressed thereon and the inhibiting outputs $E_1'$ and $F_1'$ are shown to have no current signals during period $W_c$. This one inhibiting signal waveform $K_1'$ is sufficient to prevent cores 2K*c* and 3K*c* from being driven into a true state by the P and $C_c$ positive current waveforms. However, since the $K_1'$ inhibiting output line is not wound about the 1K*c* core, this core will be driven to a true state. It follows that the input to the K register transfer circuit during the following $R_c$ period, which functions to cause output $K_1$ thereof to be high, will be generated as a result of the switching of core 1K*c* back to a zero state.

It should be noted that all the functions of a digital computer can be defined by Boolean equations in the form of a series of sums of products. Thus the circuits of the present invention are capable of easily mechanizing the processes of a complex large-scale computer by merely inductively linking wires to a core corresponding to all the complemented terms of a product and linking a common sense line to all the cores which are to be summed to form the function.

Consider now the four binary digit serial storage portion comprising cores 1E*s* to 4E*s* of the E register of FIG. 2, extracted and shown with control core logic in FIG. 15 as incorporated in a digital computer. With regard to utilization to perform an arithmetic process, the logic for the sign digit must be different from the logic for manipulating the other digits. Additionally, if, for instance, the same register is to perform the operations of recirculation, transfer, complementation, and counting, some means of program control is necessary. It may be observed in FIG. 15 that a double diagonal 95 is employed to symbolize signal $C_c$ being coupled twice through cores 1E*c*, 2E*c*, and 3E*c*. This is to indicate that a half-current flowing in two loops of conductor 35 (FIG. 2) about each of these cores will suffice to switch these cores. This is equivalent to coupling all timing digit signal (P) conductors 36 to the cores with the same polarity. In construction, a core matrix may be arranged in either way when, in accordance with its governing equation, a core is to be active during all digit transfer cycles making up the computer word. Program control here takes the form of program counter number outputs 0, 1, 2, and 3 comprised of combinations of inhibiting propositions $N_1'$, $N_1$, $N_2'$, and $N_2$ which may be derived as the outputs of flip-flops or transfer circuits associated with a program counter. These propositions define which of the above four operations is to be done, and serve to select the circuitry for accomplishing them as listed in the table of FIG. 16. Thus, in FIG. 15, when the logical term $N_1'N_2'$ is effective, only core 1E*c* is released for switching. Since only the proposition $E_1'$ is coupled to core 1E*c*, it is seen that this core provides for the recirculation operation. When the term $N_1N_2'$ is effective, it may be observed that core 2E*c* operates to transfer information, digit by digit, into the E register from the F register. When the term $N_1'N_2$ is effective, core 3E*c* provides for "ones" complementation of the information in the E register. It will be further observed that, if the K register is devoted to the carry digit generated as the result of an arithmetic operation, and proposition $K_1$ is true at the beginning of cycle $P_2$, then, after the sign digit which is understood to be stored in core 1E*s* is recirculated unchanged by core 4E*c*, cores 5E*c* and 6E*c* provide for the addition of one unit (under control of term $N_1N_2$) to the number stored in cores 2E*s*, 3E*s*, and 4E*s*; this, of course, is the operation of counting.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a magnetic core system: a first and a second magnetic core, each having substantially rectangular hysteresis characteristics, each said core being capable of existing in a true or false state; driving means capable of supplying driving currents on successive periods for switching said first core false, said second core true and then false and said first core true; and transfer circuit means for generating signals for inhibiting the switching of one of said cores true by said driving means dependent upon whether or not the other of said cores has been switched false.

2. A circuit for generating a logical process comprising: a first and a second controlled bistable magnetic core; a plurality of controlling bistable magnetic cores associated with each said controlled core, said controlling cores each having an initial direction of magnetization; driving means for switching said cores; means for supplying to said controlling cores various combinations of data signals read by said driving means from said controlled cores, said data signals being capable of inhibiting said controlling cores from being switched by said driving means to the opposite direction of magnetization; and means for supplying to said controlled cores control signals read by said driving means from the controlling cores, said control signals being capable of inhibiting said controlled cores from being switched by driving means back to their original direction of magnetization.

3. A circuit for generating a logical process comprising: a first and a second controlled bistable magnetic core; a plurality of controlling bistable magnetic cores associated with each said controlled core, said controlling cores each having an initial direction of magnetization; a first driving means for said controlled cores; a second driving means for said controlling cores; means for simultaneously supplying to said controlling cores various combinations of data signals read from said controlled cores by said first driving means, said data signals being capable of inhibiting said controlling cores from being switched to the opposite direction of magnetization by said second driving means; and means for supplying to said controlled cores control signals read from the controlling cores by said second driving means, said control signals being capable of inhibiting said controlled cores from being switched back to their original direction of magnetization by said first driving means.

4. Circuitry for performing logical operations, comprising: a plurality of bistable magnetic core arrays grouped in pairs; a sense conductor coupled to each pair of arrays; a first source of read and write signals for switching cores of said first array for each pair; a second source of read and write signals for switching cores of said second array for each pair; and an individual transfer circuit connected to the sense conductor of each pair of arrays, each said transfer circuit having a pair of outputs coupled to the cores of its own array and other arrays in a predetermined arrangement.

5. Circuitry for performing logical operations, comprising: a plurality of bistable magnetic core arrays grouped in pairs; a sense conductor coupled to each pair of arrays; a first source of read and write signals for driving cores of the first array of each pair, said write signals being separated from said read signals by an interval of time; a second source of write and read signals for driving cores of the second array of each pair, the signals of said second source successively occurring during the time interval between the signals of said first source; and a separate transfer circuit connected to the sense conductor of each pair of arrays, each said transfer circuit having a pair of outputs coupled to the cores of its own array and other arrays in a predetermined arrangement, said transfer circuit being triggered by the signals of said first source reading said first array of each pair to generate signals on the outputs thereof for inhibiting cores of said second array from being written into by the signals of said second source, and also being triggered by the signals of said second source reading said second array of each pair to generate signals on the outputs thereof for inhibiting cores of said first array of each pair from being written into by the signals of said first source.

6. Circuitry for performing logical operations, comprising: a plurality of bistable magnetic core arrays arranged in pairs; a sense conductor coupled to each pair of arrays; a first source of periodic read and write square wave signals for driving cores of said first array of each pair, said write signals being separated from said read signals by an interval of time; a second source of periodic read and write square wave signals for driving cores of said second array of each pair, the signals of said second source successively occurring during the time interval between the signals of said first source; and a separate transfer means for each pair of arrays, said transfer means including a flip-flop circuit having a true and false trigger input and a true and false output, one of the trigger inputs being connected to the corresponding said sense conductor and the other trigger input being connected to a source of trigger signals occurring coincident with the write signals of said first and second sources, said flip-flop outputs coupled to the cores of its own array and other arrays in a predetermined arrangement, whereby said flip-flop is triggered to generate a signal on said false output at the end of every write signal and is triggered to generate a signal on said true output during the following write signal period only if a signal has been read out of one of said arrays by the intervening read signal.

7. A magnetic switching circuit for generating a logical function, comprising: a plurality of bistable magnetic cores, each having an initial direction of magnetization; a sense line coupling all said cores; a plurality of inhibiting lines coupling different combinations of said cores; drive lines coupling all of said cores; a source of drive current connected to said drive lines and capable of driving said cores into the opposite direction of magnetization during a first period and then back into the initial direction of magnetization during a second period; and a source of high or low signals connected to each of the inhibiting lines, said drive currents being inhibited during the first period of said drive source from changing the direction of magnetization of any core through which a high signal is sent on one of said inhibiting lines, and said drive currents operating during the second period of said drive source to drive any core back to its initial direction of magnetization, thereby generating a signal on said sense line indicative of the logical function.

8. Apparatus for solving logical operations, comprising: a plurality of storage bistable magnetic cores for storing data to be operated upon; a plurality of control bistable magnetic cores; a first circuit means for simultaneously interrogating said plurality of storage cores to generate high or low output voltages corresponding to the data stored therein; a second circuit means capable of setting said control cores dependent on combinations of the high voltage output signals generated in said first circuit means by interrogation of said storage cores; a third circuit means for simultaneously interrogating said control cores to generate high or low output voltages corresponding to the data stored therein; and a fourth circuit means capable of setting each of said storage cores dependent on the output signals generated in said third circuit means by interrogation of said control cores.

9. Circuitry for generating a signal corresponding to a logical function comprised of a plurality of terms, each said function defined as the logical sum of a plurality of logical products, comprising: a bistable magnetic element for each logical product of the function; a source of write and read driving signals capable of switching the state of said magnetic elements; means to supply a signal corresponding to the complement of each term appearing in the function; said latter means coupled to the respective magnetic element such that the signal supplied thereby can induce a field therein in opposition to said write driving signal; and means including a conductor coupled to all of the magnetic elements for sensing the value of the function as a change in state of a core caused by a read driving signal.

10. Circuitry for mechanizing a digital function defined by a logical sum of a plurality of logical products comprising: a plurality of storage magnetic cores capable of stability in either a true or false state, each of said cores representing one of the terms of said function; a first current pulse source capable of switching said storage cores from the true to false state to read a signal stored therein; a plurality of control magnetic cores capable of stability in either a true or false state, one of said control cores for each logical product in the function; a transfer circuit associated with each said storage core for generating signals representing the term read therefrom by said first current pulse source, said tansfer circuits each having a pair of output lines, said output lines corresponding to the complement of the individual terms of one of the logical products being coupled to each said control core; a second current pulse source capable of switching each said control core from the false to the true state if not inhibited by signals from said transfer circuits; readout means responsive to the change of state of any one of said control cores from the true state back to the false state for generating a signal representing the function; and a third current pulse source capable of switching said control cores from the true state back to the false state, to thereby generate the signal on said readout means representative of the function.

11. A magnetic core register circuit, comprising: a storage magnetic core and a plurality of control magnetic cores each having substantially rectangular hysteresis characteristics, and each said core being capable of existing in a true or false state; driving means capable of sequentially switching said storage core false during a first period, said control cores true during a second period and then false during a third period, and then said storage core true during a fourth period; transfer circuit means having an input coupled to said storage and control cores, and a pair of outputs, one of which is coupled to said storage core and both of which are connected to said control cores, said transfer circuit means capable of being triggered true during said first period in accordance with data read out of said storage core, said transfer circuit means being operable during said second period for generating signals on the outputs thereon capable of inhibiting the switching of any control core coupled to its outputs; other sources coupled to said control cores and capable of supplying signals for inhibiting the switching thereof during said second period, said transfer circuit means capable of being triggered during said third period in accordance with the data read out of all said control cores, and said transfer circuit means being operable during said fourth period for generating signals on an output thereof capable of inhibiting the switching of the storage core.

12. Apparatus for solving logical operations, comprising: a plurality of groups of storage cores for storing data to be operated upon; a plurality of groups of control cores, each associated with one of the groups of storage cores; individual transfer means associated with corresponding groups of storage and control cores, said transfer means having inputs from its own group of storage and control cores and outputs connected in various combinations to storage and control cores of all groups; driving means capable of setting said storage and control cores, said driving means being operable to simultaneously interrogate a selected core of each group of storage cores and to trigger its associated transfer means to provide high and low voltages on the outputs thereof corresponding to the data stored therein, further operable to set each of said control cores dependent on signals generated on the outputs of said transfer means, further operable to then simultaneously interrogate all the cores of each group of control cores and to trigger its associated transfer means to provide high and low voltages on the outputs thereof corresponding to the data stored in each group, and also operable to then set the selected core of each group of storage cores dependent on the signals generated on the outputs of its associated transfer means.

13. A circuit for logically manipulating data, comprising: a first, second, and third register, each including a plurality of bistable magnetic elements; means to arrange a first array comprising one or a plurality of the elements of each said register as storage for digit signals and a second array comprising one or a plurality of the elements of each said register as a control for said storage array; a source of read-write driving signals for said storage and control cores; and a data transfer circuit for each said register, each said transfer circuit functioning to supply inhibiting signals coincident with the write driving signal in one of said arrays in accordance with data signals read out of the other of said arrays.

14. A data processing circuit comprising: a first, secon, and third register, each having a plurality of magnetic elements with substantially rectangular hysteresis characteristics and two corresponding states of remanent magnetization, each of said registers also having a transfer circuit capable of generating signals on outputs therefrom dependent on data read out of said elements; means to arrange the elements of each said register to form a pair of corresponding arrays in each register; a first driving means for supplying signals capable of changing the state of magnetization of the elements of one array of each register; a second driving means for supplying signals capable of changing the state of magnetization of the elements of the other array of each register; means for sensing any changes in states produced in the elements of each of the arrays of said registers by said first and second driving means to generate signals for triggering said transfer circuits; and means responsive to the output signals generated by said transfer circuits and inductively coupled to the elements of the arrays of the registers in a predetermined arrangement so as to be able to inhibit the changing of state of magnetization of the elements by said first or second driving means.

15. A circuit for logically manipulating data comprising: a first, second, and third register, each comprising a plurality of bistable magnetic elements; means to arrange a first array of one or a plurality of the elements of each said register as storage for digits and a second array of one or a plurality of the elements of each said register as control for said storage elements; a four-period timing signal generator providing pulses for reading a storage element of each register during a first period, of writing into the control elements during a second period, of reading the control elements during a third period, and of writing into the storage element of each said register during a fourth period; and a data delay transfer circuit for each said register operative to supply pulses for inhibiting the pulses of said timing signal generator from writing in one of said arrays during the second and fourth periods in accordance with data read out of the other of said arrays during the first and third periods, respectively.

16. A circuit for logically manipulating data comprising: a first, second, and third register, each comprising a plurality of magnetic cores; means to arrange a first array of one or a plurality of the cores of each said register as storage for digits and a second array of one or a plurality of the cores of each said register as control for said storage cores; a four-period timing signal generator providing pulses for reading a storage core of each register during a first period, of writing into the control cores during a second period, of reading the control cores during a third period, and of writing into the storage cores of each said register during a fourth period; and a data delay transfer circuit for each said register controlled to generate a first inhibiting signal during a write period as a result of none of the cores of its register being successfully read, and a second inhibiting signal during a write period as a result of at least one core of its register being successfully read.

17. A circuit for generating a logical process comprising: a first and second controlled bistable magnetic core; a plurality of controlling magnetic cores associated with each said controlled core, said controlling cores each having an initial direction of magnetization; a first driving means for said controlled cores; a second driving means for said controlling cores; means for supplying to said controlling cores various combinations of data signals as simultaneously read from said controlled cores by said first driving means, said data signals being capable of affecting the switching of said controlling cores to the opposite direction of magnetization by said second driving means; and means for supplying to said controlled cores control signals read from said controlling cores by said second driving means, said control signals being capable of affecting the switching of said controlled cores back to their original direction of magnetization by said first driving means.

18. Circuitry for performing logical operations, comprising: a controlled element and a controlling element each capable of existing in a first or a second stable state; means capable of switching, on successive periods, said controlled element to the second state, said controlling element to the first state, said controlling element to the second state and said controlled element to the first state; and circuit means for generating signals inhibiting the switching of one of said elements to the first state dependent upon whether or not the other of said elements has been switched to the second state.

19. Circuitry for performing logical operations, comprising: a plurality of bistable state element arrays arranged in pairs; individual sensing means to sense a change in state of an element of each pair of arrays; a first source of read and write signals for switching elements of one array of each pair; a second source of read and write signals for switching elements of the other array of each pair; an individual transfer circuit for each pair of arrays, each said transfer circuit being responsive to its associated sensing means to generate signals on its output; and means to couple the output of said transfer circuit to its own pair of arrays and to other pairs of arrays in an arrangement determined by the logical operations to be performed.

20. A circuit for generating a logical process comprising: a first and a second controlled bistable magnetic core; at least one controlling bistable magnetic core associated with each said controlled core, said controlling cores each having an initial direction of magnetization; a first means for switching said controlled cores to said initial direction of magnetization; a second means for switching said controlling cores to the opposite direction of magnetization; means for inhibiting said controlling cores from being switched by said second means to said opposite direction of magnetization in accordance with signals read out of said controlled cores by said first means; a third means for switching said controlling cores to said initial direction of magnetization; a fourth means for switching said controlled cores to said opposite direction of magnetization; and means for inhibiting said controlled cores from being switched by said fourth means to said opposite direction of magnetization in accordance with signals read out of said controlling cores by said third means.

21. Circuitry for performing logical operations, comprising: a plurality of bistable magnetic core switch arrays; a common output means for each pair of arrays; a source of timing signals; an individual gate having one input connected to the output means for each pair of arrays, each said gate having a control input connected to the source of timing signals; a first source of periodic currents synchronized with said timing signals and capable of switching the cores of one array in each pair; a second source of periodic currents synchronized with said timing signals and capable of switching the cores of the other array in each pair; an individual flip-flop circuit for each pair of arrays, each said flip-flop circuit having a pair of outputs and having one trigger input thereto connected to the output of its associated gate and the other trigger input thereto connected directly to said timing signal source; and means inductively coupling the outputs from said flip-flop circuits to the cores of the arrays in accordance with the logical operations to be performed, whereby data sensed by switching the cores of one array in each pair by one of said sources of periodic currents is set up in its respective flip-flop circuit, such that the outputs thereof serve to selectively inhibit the switching of cores in the other array in each pair by the other source of periodic currents.

22. A generator of a signal representing a logical function, comprising: first and second pluralities of bistable magnetic cores, each having a substantially rectangular hysteresis loop; first and second means to apply magnetomotive driving currents to switch said cores; a timing signal combining with the application of the driving currents to said cores to effect sequential periods of application of drive to the first condition of saturation to said first plurality of cores, to the second condition of saturation to said second plurality of cores, and then to the first condition of saturation to said second plurality of cores; a circuit means for each core in said first plurality of cores having a first output effective on change in state of its respective core during the period when said first means drives the core to the first condition of saturation and a second output effective when there is no change in state of any core during the period when drive is applied to any core to the first condition of saturation; and means inductively coupling the outputs of said circuit means to said second plurality of cores in accordance with a code corresponding to the terms of the logical function to be generated so as to inhibit drive applied to said second plurality of cores; and output circuit means for said second plurality of cores operable in response to a change of state during the period when said second means drives the second plurality of cores to the first condition of saturation to generate a signal corresponding to said logical function.

23. A circuit for generating a logical function, comprising: a plurality of storage cores and a plurality of control cores, each of said cores having a true and a false state of magnetic stability; means to supply clock current pulses; means to supply timing current pulses which combine with said clock current pulses to provide sequential periods of drive to the false state for said storage cores, to the true state for said control cores, and to the false state for said control cores; an individual transfer circuit for each said storage core capable of separately generating on a pair of output leads a true or a false output current pulse during the periods for which drive current to the true state is being applied to each said storage cores, each said transfer circuit being responsive to change of state of said storage cores from the true state to the false state to produce the true output current pulse, otherwise to produce the false output current pulse; the output leads from said transfer circuit being inductively coupled to said control cores in accordance with the terms of the logical function to be generated so as to inhibit the applied drive current from driving the control cores true; and means responsive to a change in state of a control core during the period when said applied drive current drives said control cores to the false state to generate a signal corresponding to the logical function.

24. A magnetic core register circuit, comprising: a storage magnetic core and a plurality of control magnetic cores each having substantially rectangular hysteresis characteristics, and each said core being capable of existing in a true or false state; driving means for supplying current pulses capable of sequentially switching said storage core false during a first period, said control cores true during a second period and then false during a third period; a first transfer circuit responsive to a change of state of a core during said first period to generate during said second period a true current output pulse, otherwise to generate during said second period a false current output pulse; a plurality of other transfer circuits each adapted to provide a true or false current output pulse during said second period, the current output pulses from said first transfer circuit being supplied to said control core during said second period simultaneously with current output pulses from said other transfer circuits in a predetermined arrangement so as to be capable of inhibiting said driving means from switching said control cores true, said first transfer circuit further responsive to a change of state of a control core during said third period to generate during said fourth period a true current output pulse otherwise to generate during said fourth period a false current output pulse, said latter current output pulses being supplied to said storage core during said fourth period so as to inhibit said driving means from switching said storage core true.

25. Apparatus for generating a logical function comprising: a storage magnetic core capable of existing in either of two remanent magnetic states designated true and false respectively; core driving means for producing currents capable of switching said storage core first false and subsequently true; an inhibit winding for the storage core; a control magnetic core also capable of existing in either of two remanent magnetic states, true or false, and initially in a false state; a sense winding inductively coupled to the control core; core driving means for producing currents capable of switching the control core first true than false; at least one inhibit winding for the control core, each adapted to be supplied with a control signal indicative of the complement of an individual term of the logical function; each said control signal acting in a sense to permit or to inhibit true switching of the control core dependent on whether the term is respectively true or false; and circuitry having an output connected to the storage core inhibit winding and so responsive to the state of the control core, as determined by the presence or absence of a signal on the sense winding at false switching of the control core, as to permit or to inhibit, respectively, the true switching of the storage core, thereby to establish the appropriate value of the logical function, true or false, in the storage core.

26. Apparatus according to claim 25 wherein the storage core is one of a plurality of similar cores and wherein the storage core driving means comprises a storage clock signal generator inductively coupled to all the storage cores and a storage core select signal generator having a plurality of outputs inductively coupled one to each storage core in the same sense as the clock signal generator, the storage cores being sequentially selected for operation by the simultaneous application of clock signal and select signal half-switching currents thereto.

27. An adder operable on a four-period cycle, said adder comprising: means for synchronously supplying each of a storage clock waveform, a control clock waveform, and an individual timing waveform for each order of digit to be added; an accumulator register, an addend register, and a carry register, each of the registers comprising a plurality of bistable magnetic cores and respective sets of windings inductively associated therewith, and each of the registers including a respective bistable-state circuit having an input line adapted to receive an input signal from windings on the cores of the register and having first and second output lines each connected to certain respective ones of said windings to supply output signals thereto, and each of the registers including respective ones of said cores with certain respective ones of said windings connected to said means to receive said storage clock waveform and others to receive said control clock waveform and others to receive one of said timing waveforms; said output lines associated with the addend register and the carry register respectively, being also connected to respective ones of said windings in the accumulator register and said output lines associated with the accumulator register being also connected to the respective ones of said windings in the carry register such that digit-representing signals stored in said registers are serially added into said accumulator register one order per cycle.

28. An adder according to claim 27, including means associated with the respective cores to cause transfer of a digit signal from one core of a register to the respective bistable-state circuit during the first period of a cycle, from the bistable-state circuit to a second core of the register in the absence of an inhibiting output from another of the bistable-state circuits during the second period of the cycle, from the said second core to said bistable-state circuit during the third period of the cycle conditional upon presence of a signal stored in the said second core at that time, and from the said bistable-state circuit to a core of said register during the fourth period of the cycle conditioned upon presence of the digit-representing signal being stored in said bistable-state circuit during the said third period.

29. Logical means for performing upon information signals supplied thereto, logical operations expressible in terms of Boolean algebra and said means being operable during successive time intervals each of which successive time intervals includes first, second, third, and fourth operating time intervals of duration shorter than said successive time intervals, said means comprising: means for producing signals demarking said time intervals and for producing information-signal translating power during required ones of said operating time intervals; a plurality of bistable magnetic binary-information storage cores each having windings inductively linked thereto and including at least one winding connected to be energized by at least one of said signals; a plurality of stable state signal means each having at least one stable state and one other state and each including a signal translation input line means inductively coupled to at least one of said cores and signal translation output line means inductively coupled to at least one of said cores, each of the stable state signal means including means to receive and temporarily store information-representing signals translated from said cores incident to change of state of at least one of said cores incident to application thereto of coercive force supplied by application of signal translating power by said timing means during said first operating time interval, each of said signal means further including means to translate during said second operating time interval the temporarily stored information-representing signals to at least one of said cores other than cores from which signals were translated during said first operating time interval but conditioned upon absence during said second operating time interval of an effective inhibiting signal from any one of said plurality of stable state signal means, each of said signal means also including means to translate from said last mentioned cores and store during said third operating time interval any information-signal previously translated during said second operating time interval but conditioned upon absence during said third operating time interval of an effective inhibiting signal provided by said bistable signal means, and further each said signal means including means for translation to at least one of said first mentioned cores during said fourth time interval a signal translated during said third operating time interval but conditioned upon absence of an effective inhibiting signal provided during said fourth operating time interval by one of said signal means; whereby logical operations defined by the inductive linkings of said input and output line means are performed during said second and third operating time intervals upon information stored in said cores.

30. Apparatus for performing a logical operation which operation is representable by a Boolean algebraic equation, and thereby produce an output signal representative of the first side of the equation in response to application of a set of binary input signals each representative of the existing status of a respective one of binary variables which variables are included in the second side of the equation, said apparatus comprising: first means recurrently tending to produce said output signal and effective to thus produce said output signal in the absence of effective inhibitory effects; second means for receiving the applied set of binary input signals and producing in response thereto respective inhibitory signals each representing the Boolean complement of a respective input signal; and means coupled with said first means, for receiving and selectively utilizing the produced inhibitory signals representing the Boolean complements to inhibit production of an output signal by said first means, whereby said first means produces an output signal only when each of said input signals represents the true state of its respective variable.

31. Apparatus for performing logical operations which may be expressed by respective Boolean equations defining true-false states of Boolean propositions, said apparatus comprising: bistable magnetic device means including a core and windings means inductively linked to the core, said windings means including an output winding, drive winding means, and at least two inhibit windings; power means for supplying power to the drive winding means to recurrently tend to reverse the state of said core and effective to reverse the magnetic state of the core unless reversal thereof is prevented by an inhibiting current in an inhibit winding, an output signal being produced in said output winding each time the core is reversed in state and being produced therein only incident to the core being so reversed in state; means effective to receive sets of binary input signals representing the true-false statuses of respective Boolean propositions defined by one side of a Boolean equation the other side of which equation is to be represented by the output signal to be evidenced in said output winding, said signal means being effective in response to receipt of binary input signals to provide corresponding false-true output inhibit current-signals representative of the Boolean inverse of respective binary input signals, any such true current-signal being capable of preventing reversal of state of said core; and means effective to apply said output inhibit current signals to respective inhibit windings to thereby inhibit said core against reversal of state only in response to true inhibit current signals, whereby an output signal induced in said output winding represents the said other side of said Boolean equation.

32. Means for selectively producing an output signal representing a logical function defined by a Boolean equation, in dependence upon concurrence of input signals representing the true statuses of respective variables defined in the equation, said means comprising: means including bistable means which when changed in state is effective to produce said output signal; means recurrently tending to force a change of state of said bistable means; means for receiving input signals representing the current status of respective ones of said variables and for producing respective inhibiting signals representing the Boolean inverses of the corresponding input signals; and means selectively utilizing only the inhibiting signals representing the Boolean inverses of the input signals representing the current statuses of the variables to therewith prevent change of state of said bistable means, whereby a produced output signal represents concurrence of true statuses of the variables.

References Cited in the file of this patent

UNITED STATES PATENTS

| | | |
|---|---|---|
| 2,696,347 | Lo | Dec. 7, 1954 |
| 2,708,722 | An Wang | May 17, 1955 |
| 2,735,021 | Nilssen | Feb. 14, 1956 |
| 2,741,758 | Cray | Apr. 10, 1956 |
| 2,754,430 | Isborn | July 10, 1956 |
| 2,781,504 | Canepa | Feb. 12, 1957 |
| 2,801,344 | Lubkin | July 30, 1957 |
| 2,802,953 | Arsenault et al. | Aug. 13, 1957 |
| 2,851,219 | Hussey | Sept. 9, 1958 |

OTHER REFERENCES

Olsen: "A Magnetic Matrix Switch and Its Incorporation Into a Coincident Current Memory." M.I.T. Thesis rpt., R–211, June 6, 1952, 96 pages, pages 76 to 96 relevant.

UNITED STATES PATENT OFFICE
CERTIFICATION OF CORRECTION

Patent No. 3,040,986 June 26, 1962

Ladimer J. Andrews et al.

It is hereby certified that error appears in the above numbered patent requiring correction and that the said Letters Patent should read as corrected below.

Column 4, lines 29 and 30, for "element" read -- elements --; column 7, line 4, for "designaed" read -- designated --; line 33, for "in" read -- is --; column 10, line 70, for "circruit" read -- circuit --; column 12, line 10, for "$E_1'$, $F_1'$, or $K_1$" read -- $E_1'$, $F_1$, or $K_1$ --; line 21, for "periol" read -- period --; line 42, for "$1E_s'1F_s'sK_s$" read -- $1E_s'1F_s'1K_s$ --; column 15, line 70, after "by" insert -- said --; column 17, line 61, for "tansfer" read -- transfer --; column 18, line 16, for "thereon" read -- thereof --; same column 18, lines 63 and 64, for "secon" read -- second --.

Signed and sealed this 23rd day of October 1962.

(SEAL)
Attest:

ERNEST W. SWIDER
Attesting Officer

DAVID L. LADD
Commissioner of Patents